United States Patent
Song et al.

(10) Patent No.: US 8,000,680 B2
(45) Date of Patent: Aug. 16, 2011

(54) SECURITY MANAGEMENT METHOD AND APPARATUS IN MULTIMEDIA MIDDLEWARE, AND STORAGE MEDIUM THEREFOR

(75) Inventors: Young-Joo Song, Suwon-si (KR);
Ki-Ho Jung, Gwacheon-si (KR);
Mun-Churl Kim, Daejeon (KR);
Hendry, Daejeon (KR)

(73) Assignees: Samsung Electronics Co., Ltd (KR);
Information and Communications University Research and Industrial Cooperation Group (KR)

( * ) Notice: Subject to any disclaimer, the term of this patent is extended or adjusted under 35 U.S.C. 154(b) by 606 days.

(21) Appl. No.: 11/652,266

(22) Filed: Jan. 11, 2007

(65) Prior Publication Data

US 2007/0192834 A1    Aug. 16, 2007

(30) Foreign Application Priority Data

Jan. 11, 2006  (KR) ................. 10-2006-0003337
Jan. 11, 2006  (KR) ................. 10-2006-0003340
Mar. 29, 2006  (KR) ................. 10-2006-0028355

(51) Int. Cl.
*H04M 1/66* (2006.01)
*H04M 1/68* (2006.01)
*H04M 3/16* (2006.01)
*H04L 9/32* (2006.01)

(52) U.S. Cl. .......................... 455/410; 726/3
(58) Field of Classification Search .......... 455/403–411;
379/189; 726/1–36
See application file for complete search history.

(56) References Cited

U.S. PATENT DOCUMENTS

| | | | |
|---|---|---|---|
| 5,892,900 A * | 4/1999 | Ginter et al. .................... | 726/26 |
| 6,526,257 B2 | 2/2003 | Doi et al. | |
| 2004/0139088 A1 | 7/2004 | Mandato et al. | |
| 2005/0022015 A1 * | 1/2005 | Van Den Heuvel et al. .. | 713/201 |

FOREIGN PATENT DOCUMENTS

KR    1020040058338    7/2004

OTHER PUBLICATIONS

Opima Specification Version 1.1. Jun. 27, 2000. International Electrotechnical Commission.*
International Organisation for Standardisation ISO/IEC JTC1/SC29/WG11 N6835 Coding of Moving Pictures and Audio; MPEG Multimedia Middleware Requirements v.2.0; Palma de Mallorca, Spain, Oct. 2004.*
International Organisation for Standardisation ISO/IEC JTC1/SC29/WG11 Coding of Moving Pictures and Audio; MPEG Multimedia Middleware: Context and Objective; Munchen, Germany, Mar. 2004.*

* cited by examiner

*Primary Examiner* — Kent Chang
*Assistant Examiner* — Kashif Siddiqui
(74) *Attorney, Agent, or Firm* — The Farrell Law Firm, P.C.

(57) ABSTRACT

A security management method in multimedia middleware of a terminal that can download a multimedia service provided from an external entity. The security management method includes if there is an access request for a particular multimedia service, determining whether there is a corresponding multimedia service; if the access-requested multimedia service does not exist in middleware of the terminal, performing negotiation for secure session setup with the external entity; setting up a secure session to the external entity using a security parameter selected as a result of the negotiation; and receiving information for the download from the external entity through the secure session, and determining whether to execute the download.

52 Claims, 21 Drawing Sheets

SECURITY MANAGEMENT METHOD AND APPARATUS IN MULTIMEDIA MIDDLEWARE, AND STORAGE MEDIUM THEREFOR

PRIORITY

This application claims priority under 35 U.S.C. §119(a) to an application filed in the Korean Intellectual Property Office on Jan. 11, 2006 and assigned Serial No. 2006-3340, an application filed in the Korean Intellectual Property Office on Jan. 11, 2006 and assigned Serial No. 2006-3337, and an application filed in the Korean Intellectual Property Office on May 29, 2006 and assigned Serial No. 2006-28355, the disclosure of each of which is herein incorporated by reference.

BACKGROUND OF THE INVENTION

1. Field of the Invention

The present invention relates generally to security technology related to multimedia middleware, and in particular, to a security management method and apparatus in multimedia middleware, capable of effectively managing security-related operations during interaction between multimedia middleware of a terminal and a multimedia service provider (or repository) providing multimedia contents. In addition, the present invention relates to a method and apparatus for security management related to multimedia middleware in a terminal.

2. Description of the Related Art

Generally, middleware refers to a software layer for interworking, such as data exchange, between an application and a network for providing identification, authentication, control and multimedia services related to devices in the network, or between applications. That is, when an application is connected to the network or applications are directly connected to each other, codes should generally be added to all of the associated applications so that an application can communicate with network devices or with another application. The use of the middleware can omit the troublesome operation of adding codes to the associated applications, because the middleware supports interworking between an application and a network, or between applications.

Of various middleware technologies, multimedia middleware technology supports, for example, on-line content, Internet broadcast, and digital data broadcast reception, and a typical communication network using the multimedia middleware can include a mobile communication network that provides various packet services to user terminals such as mobile phones. For example, for the mobile communication network, manufacturers of the conventional mobile terminals comprehensively design and manufacture mobile terminals including necessary hardware and software therein, taking the functions and services required by users into account. However, to meet the rapid growth of the mobile communication market and diversified user demands, there is a need for frequent design change. Therefore, the conventional terminal design method could not provide sufficient flexibility for accommodating the market needs.

Recently, therefore, with the use of middleware technology for interfacing between a platform and an upper application of the terminal, the mobile terminal manufacturers, recognizing the limitations of the conventional terminal design method, now provide support for various multimedia applications without greatly modifying the design of the mobile terminal every time they install a new application.

However, multimedia middleware technology has managed a multimedia-related security processing function with no device capable of managing a security process, included in the middleware, without using a separate security process during communication with an external entity such as the multimedia service provider, or without using a universal procedure even though there is a security process. In addition, the conventional technology may not prevent spread of malicious codes and viruses using the security loophole, and should inefficiently manage the middleware due to resource waste, high complexity of a security processing function, and the like, caused by the absence of the universal security procedure.

In addition, the absence of the standardized security management method and procedure disables an automatic negotiation process through the middleware during communication of a mobile terminal that uses various security algorithms, thereby causing an unnecessary waste of time and terminal resources for setting up a new secure channel, and increasing complexity of the negotiation process.

SUMMARY OF THE INVENTION

An object of the present invention is to address at least the problems and/or disadvantages above and to provide at least the advantages described below. Accordingly, an object of the present invention is to provide a method and apparatus for security management between a terminal using multimedia middleware and an external service provider (or repository), and a storage medium therefor.

Another object of the present invention is to provide a security management method and apparatus for a middleware service in a terminal using multimedia middleware, and a storage medium therefor.

Further, another object of the present invention is to provide a metadata structure capable of specifying a security algorithm and protocol, which are being used or can be used in multimedia middleware.

According to one aspect of the present invention, there is provided a security management method in multimedia middleware of a terminal that can download a multimedia service provided from an external entity. The security management method includes if there is an access request for a particular multimedia service, determining whether there is a corresponding multimedia service; if the access-requested multimedia service does not exist in middleware of the terminal, performing negotiation on secure session setup with the external entity; setting up a secure session to the external entity using a security parameter selected as a result of the negotiation result; and receiving information for the download from the external entity through the secure session, and determining whether to execute the download.

According to another aspect of the present invention, there is provided a security management apparatus in multimedia middleware of a terminal that can download a multimedia service provided from an external entity. The security management apparatus includes a security manager for, if a requested particular multimedia service does not exist in middleware of the terminal, performing negotiation on secure session setup with the external entity, and setting up a secure session to the external entity using a security parameter selected as a result of the negotiation result; and a service manager for, if there is an access request for the particular multimedia service, determining whether there is the particular multimedia service, receiving information for the download from the external entity through the secure session, and determining whether to execute the download.

According to a further aspect of the present invention, there is provided a security management method performed in multimedia middleware in a terminal. The security management method includes if there is an access request to a particular multimedia service from a particular application program, checking a license list including its access right information; and if there is an access right of the particular application program, delivering a handler for the particular multimedia service to the particular application program. The license list includes information indicating an access right of application programs for middleware services supportable by the terminal.

According to yet another aspect of the present invention, there is provided a security management method performed in multimedia middleware in a terminal. The security management method includes: if there is an access request to a particular platform resource from a particular multimedia service, generating an access identifier thereof, and checking a license list including access right information based on the access identifier; and if there is an access right to the particular multimedia service, delivering system resource to the particular multimedia service. The license list comprises information indicating an access right to multimedia services for platform resources supported by the terminal.

According to still another aspect of the present invention, there is provided a security management apparatus included in multimedia middleware in a terminal. The security management apparatus includes a service manager for receiving an access request to a particular multimedia service from a particular application program, and delivering a handler for the particular multimedia service to the particular application program, if there is an access right to the particular application program; and a security manager for checking a license list including access right information for the particular application program in response to a request of the service manager. The license list comprises information indicating an access right to application programs for middleware services supportable by the terminal.

According to still another aspect of the present invention, there is provided a security management apparatus included in multimedia middleware in a terminal. The security management apparatus includes a security manager for, if there is an access request to a particular platform resource from a particular multimedia service, generating an access identifier thereof, and if there is an access right to the particular multimedia service, delivering system resources to the particular multimedia service; and an RRE for checking a license list including access right information based on the access identifier in response to a request of the security manager. The license list comprises information indicating an access right to multimedia services for platform resources supported by the terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Figure 1:
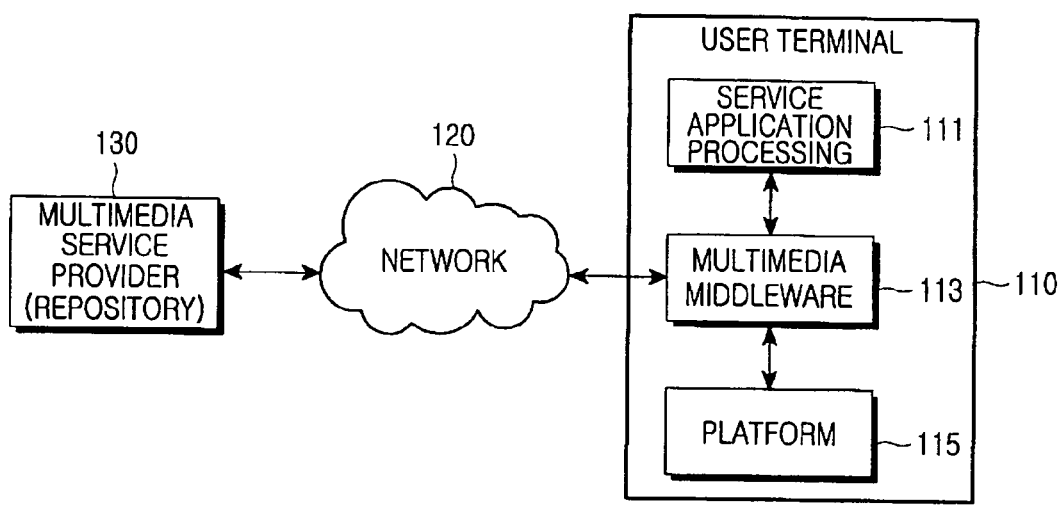
FIG. 1 is a block diagram illustrating a configuration of a network system to which a user terminal including a multimedia middleware apparatus according to the present invention makes access.

Preferred embodiments of the present invention will now be described in detail with reference to the annexed drawings. In the following description, a detailed description of known functions and configurations incorporated herein has been omitted for clarity and conciseness.

The present invention will be described in two aspects.

A first aspect of the present invention described with reference to FIGS. 1 to 15 provides a security management method and apparatus for handling security problems which may occur when a user terminal requiring a multimedia application communicates with a multimedia service provider (or repository), and an open multimedia middleware structure including a security management means. The security management means is for authentication, security parameter exchange and secure channel setup during service exchange with a multimedia service provider, which is an external entity.

To this end, the present invention provides a metadata (or MPEG Multimedia Middleware Logical Service (M3WLS)) structure that defines a security protocol and algorithm for performing a security procedure which may occur when a user terminal requiring a multimedia application communicates with a multimedia service provider, which is an external entity, as shown in, for example, FIGS. 11 to 15. The metadata structure that has defined the security protocol and algorithm is a data structure including specification on Data Transfer Protocols, Authentication Protocols, Signature Types, and Encryption Types during service exchange between a mobile terminal including multimedia middleware according to the present invention and a multimedia service provider, and secure channel setup and data exchange between multimedia service entities is achieved using the metadata according to the present invention.

A second aspect of the present invention described with reference to FIGS. 16 to 24 provides a security management method and apparatus for performing Governed Access through License List management when an application program/middleware service makes access to internal service/internal resource in a user terminal requiring a multimedia application, and for verifing whether the application program/middleware service has a right to use, and a multimedia middleware structure including a security management means.

That is, with the use of the metadata structure, the second aspect provides a procedure for verifying whether an application program has an access and use right for an internal service when a multimedia terminal provides a middleware service needed by the multimedia application program, and for verifying whether the middleware service has an access and use right for the internal service when the middleware service uses internal resources of a terminal platform, and also provides an access right.

The metadata expressing the access right specifies, for example, access principal (Principal), access object (AccessObject), access condition (Condition), and access type (AccessType), in order to express "what principal can make what access for what object in what condition," and with the use of it, provides a method and apparatus for checking an access and use right between an application program and an internal service, i.e. between middleware services, or between a middleware service and a platform resource.

In the present invention, the metadata, which is systematized data, i.e. data for describing other data, means data added to contents according to a stated rule so as to allow a terminal to efficiently search for desired information from the large amount of information. Further, in the present invention, the term "service" or "multimedia service" will be construed as a concept including a multimedia middleware service.

FIG. 1 is a block diagram illustrating a configuration of a network system to which a user terminal including a multimedia middleware apparatus according to the present invention makes access, and the block diagram shows a system application framework including a user terminal 110, a network 120, and a multimedia service provider (or repository) 130.

In FIG. 1, the user terminal 110 refers to a wire terminal (for example, a computer having a network access means), or a wireless terminal (for example, cellular phone, PCS, PDA, IMT-2000, PDA phone, and smart phone). The network 120 can be various wire/wireless communication networks. The multimedia service provider 130 can be a server that provides a multimedia application to the user terminal 110, or a storage medium containing a multimedia application. The multimedia application can be execution codes for content, metadata or multimedia middleware service, i.e. can be service implementation codes. The user terminal 110 includes a multimedia middleware block 113 that performs a security process of processing metadata and execution codes received from an upper layer through a service application processing block 111 for executing a multimedia application, the network 120, or a storage medium; performing a security process which may occur during service exchange with the multimedia service provider 130 according to the first aspect of the present invention; verifying whether the application program has an access and use right for the middleware service according to the second aspect of the present invention; and verifying whether the middleware service has an access and use right for resources of a platform, and also includes a platform block 115 in which a basic operating system (OS) supporting a multimedia service of the user terminal 110 is installed.

The term "security" in the first aspect of the present invention means an operation of setting up a secure session when a terminal downloads a service from the external multimedia service provider 130, and the term "security" in the second aspect of the present invention means an operation of verifying an access and use right (hereinafter an "access right") between application program in a terminal, middleware service, and resources.

Figure 2:
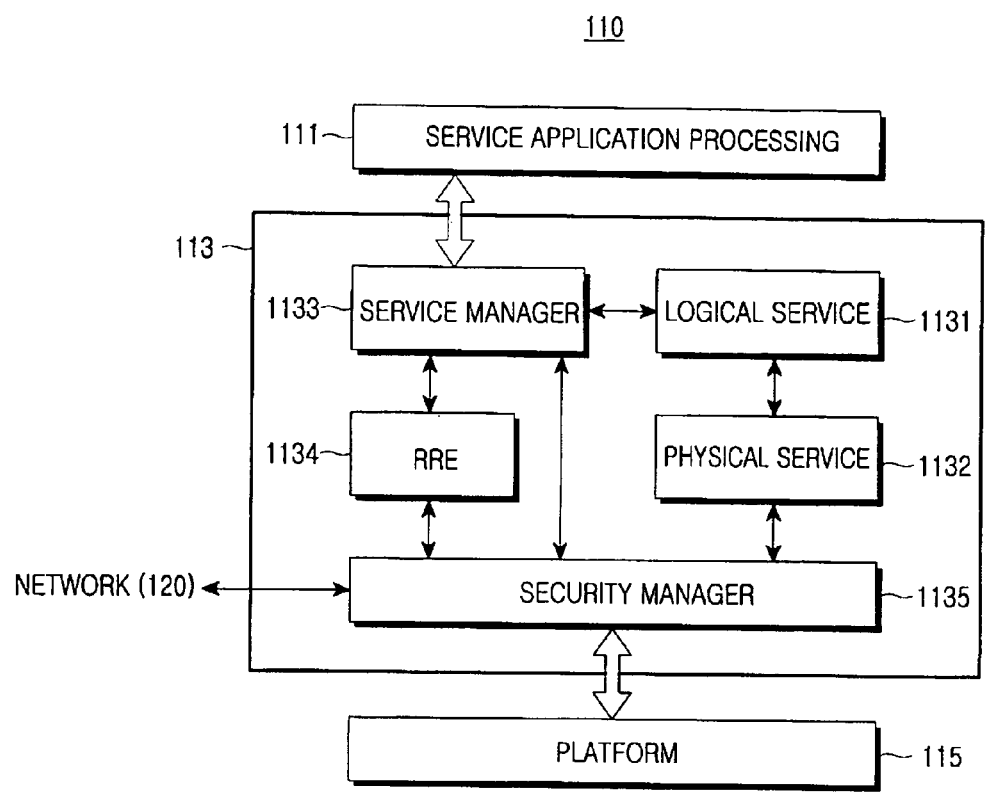
FIG. 2 is a block diagram illustrating a structure of a user terminal including a multimedia middleware apparatus according to the present invention.

FIG. 2 is a block diagram illustrating a structure of a user terminal including a multimedia middleware apparatus according to the present invention.

Referring to FIG. 2, a multimedia middleware block 113 constituting the multimedia middleware apparatus is connected to a service application processing block 111 via an application layer interface (not shown), and is connected to a platform block 115 via a platform layer interface (not shown). The multimedia middleware block 113 includes a logical service block 1131 composed of service metadata, a physical service block 1132 composed of service implementation codes, a service manager 1133 for management of the logical service and the physical service, an M3W Run-time Environment (RRE) 1134, and a security manager 1135.

In the first aspect of the present invention, the service manager 1133 corresponding to a controller of the multimedia middleware block 113 performs management on the service metadata of the multimedia middleware. That is, the metadata necessary for the multimedia service transmitted from the multimedia service provider 130 via the network 120 of FIG. 1 is received through a service metadata transceiver (not shown), and the service manager 1133 checks service implementation codes of the metadata and downloads corresponding service implementation codes.

The service manager 1133 acquires a Service Profile (hereinafter "service information") as information on a corresponding service from the multimedia service provider 130, acquires a Target Profile (hereinafter "execution environment information") as information on an execution environment of the corresponding service from the RRE 1134, and acquires a Security Profile (hereinafter "security information") as information on a security method from the security manager 1135.

To this end, the security manager 1135 sets up a communication channel (secure session) through a predetermined security procedure with the multimedia service provider 130, and the service manager 1133 downloads the service information, execution environment information, and security information from the multimedia service provider 130. The download operation is performed when a user has requested access to a specific service but there is no corresponding service in the middleware of the terminal.

A detailed description of an operation performed in the service manager 1133, the RRE 1134 and the security manager 1135 for verification of an access and use right for internal service/internal resource in the terminal supporting the multimedia middleware according to the second aspect of the present invention will be made later.

With reference to FIGS. 3 to 8, a description will first be made of a multimedia middleware security management method in which the multimedia middleware block 113 sets up a security-established session (hereinafter "secure session") by acquiring security information from the external multimedia service provider 130, and performs download of a new service.

Figure 3:
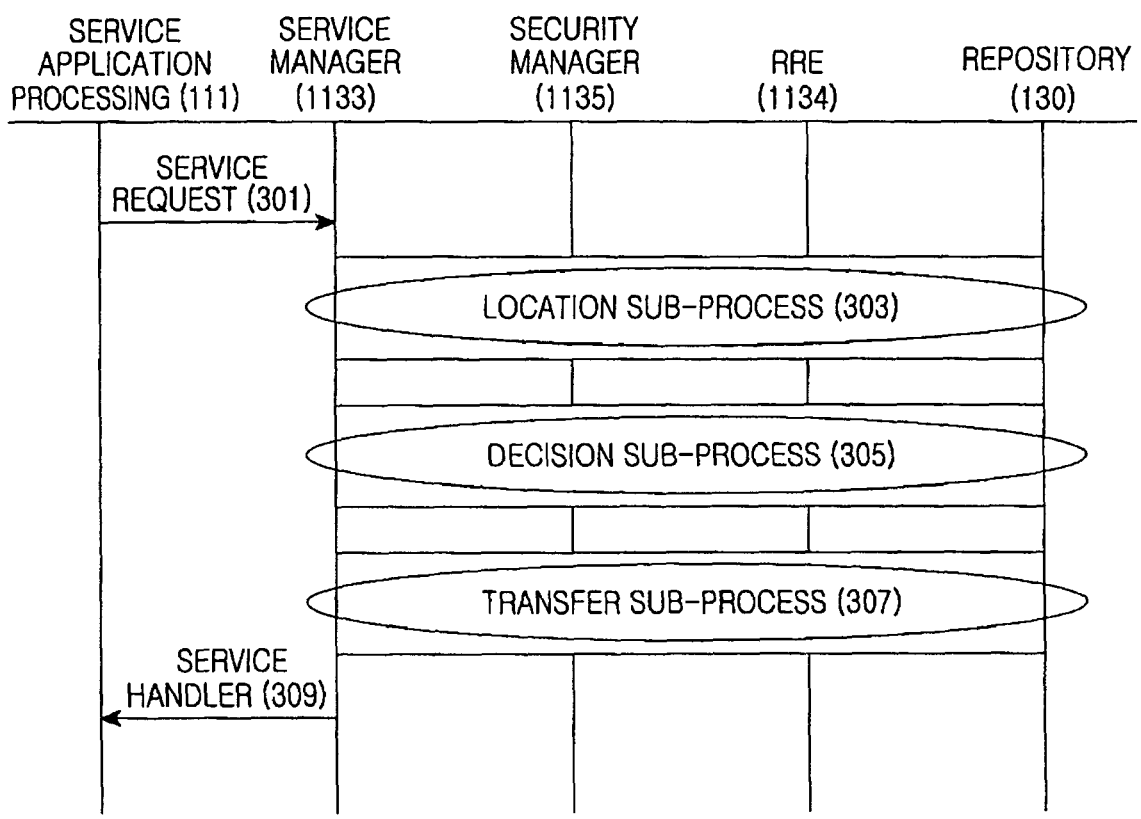
FIG. 3 is a flowchart illustrating a download process with an external entity in a multimedia framework according the present invention.

FIG. 3 is a flowchart illustrating a download process with an external entity in a multimedia framework according to the present invention.

Referring to FIG. 3, even though a service application processing block 111 of a user terminal 110 has sent an access request for a particular service to a service manager 1133 in a multimedia middleware block 113, if there is no corresponding service in the middleware, the service manager 1133 first undergoes a download process for acquisition of the corresponding service from a multimedia service provider 130. For the download process, in step 301, the service manager 1133 sends a network address request for the multimedia service provider 130, which is an external entity that can provide the corresponding service, to an RRE 1134.

Thereafter, the service manager 1133 acquiring a network address of the multimedia service provider 130 first sends in step 303 a secure connection request to a security manager 1135 before it communicates with the corresponding multimedia service provider 130. The security manager 1135 performs a Location Sub-process 303 of setting up a communication channel through a predetermined security procedure, with the multimedia service provider 130.

In step 305, the service manager 1133 performs a Decision Sub-process of acquiring corresponding service information (Service Profile) from the multimedia service provider 130, acquiring execution environment information (Target Profile) from the RRE 1134, and acquiring security information (Security Profile) from the security manager 1135.

Thereafter, in a Transfer Sub-process of step 307, the service manager 1133 determines whether to perform or cancel download of the corresponding service, by analyzing the service information, execution environment information and security information acquired in step 305. If the service manager 1133 determines to perform the download, it starts the Transfer Sub-process. In this case, the service manager 1133 transfers its right for a secure session to the RRE 1134, and the RRE 1134 downloads the corresponding service through communication with the multimedia service provider 130. If the download service ends, the service manager 1133 sends a close request for the secure session to the security manager 1135.

If the Transfer Sub-process ends in this way, the service manager 1133 transfers in step 309 the newly acquired service handler to the service application processing block 111.

Figure 4:
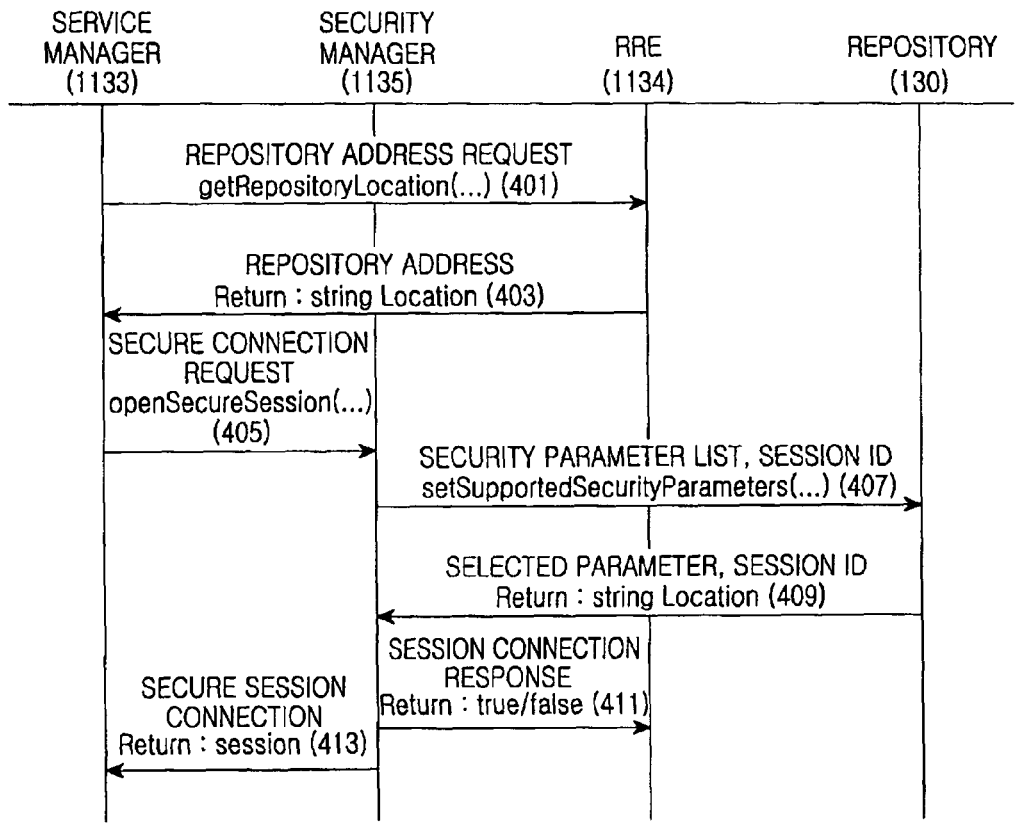
FIG. 4 is a flowchart illustrating a detailed operation of the Location Sub-process of FIG. 3.

FIG. 4 is a flowchart illustrating a detailed operation of the Location Sub-process of FIG. 3, and this includes the network address acquisition process for the multimedia service provider 130, described in FIG. 3, and a security establishment process between the security manager 1135 and the multimedia service provider 130.

In step 401, the service manager 1133 sends a network address request for the multimedia service provider (repository) 130 that can provide the corresponding service, to the RRE 1134. In step 403, the RRE 1134 provides a network address connectable to the corresponding multimedia service provider (repository) 130 to the service manager 1133. Thereafter, in step 405, the service manager 1133 transfers the network address of the multimedia service provider 130 to the security manager 1135 before it communicates with the corresponding multimedia service provider 130, and then sends a security establishment request thereto.

In step 407, the security manager 1135 provides information on security parameters for security establishment, such as security parameter list, session ID and the like, to the multimedia service provider 130 having the address provided from the service manager 1133. In step 409, the multimedia service provider 130 selects a parameter and a session ID to be used for actual communication among the security parameters provided from the security manager 1135, and sends a response to the security manager 1135. In step 411, the security manager 1135 sends a session connection response to the multimedia service provider 130. If the selection of the security parameters ends in this way, the security manager 1135 provides in step 413 the corresponding information to the service manager 1133 for secure session connection, and the service manager 1133 sends a connection request for the security-established communication session, i.e. secure session, to the security manager 1135.

Figure 5:
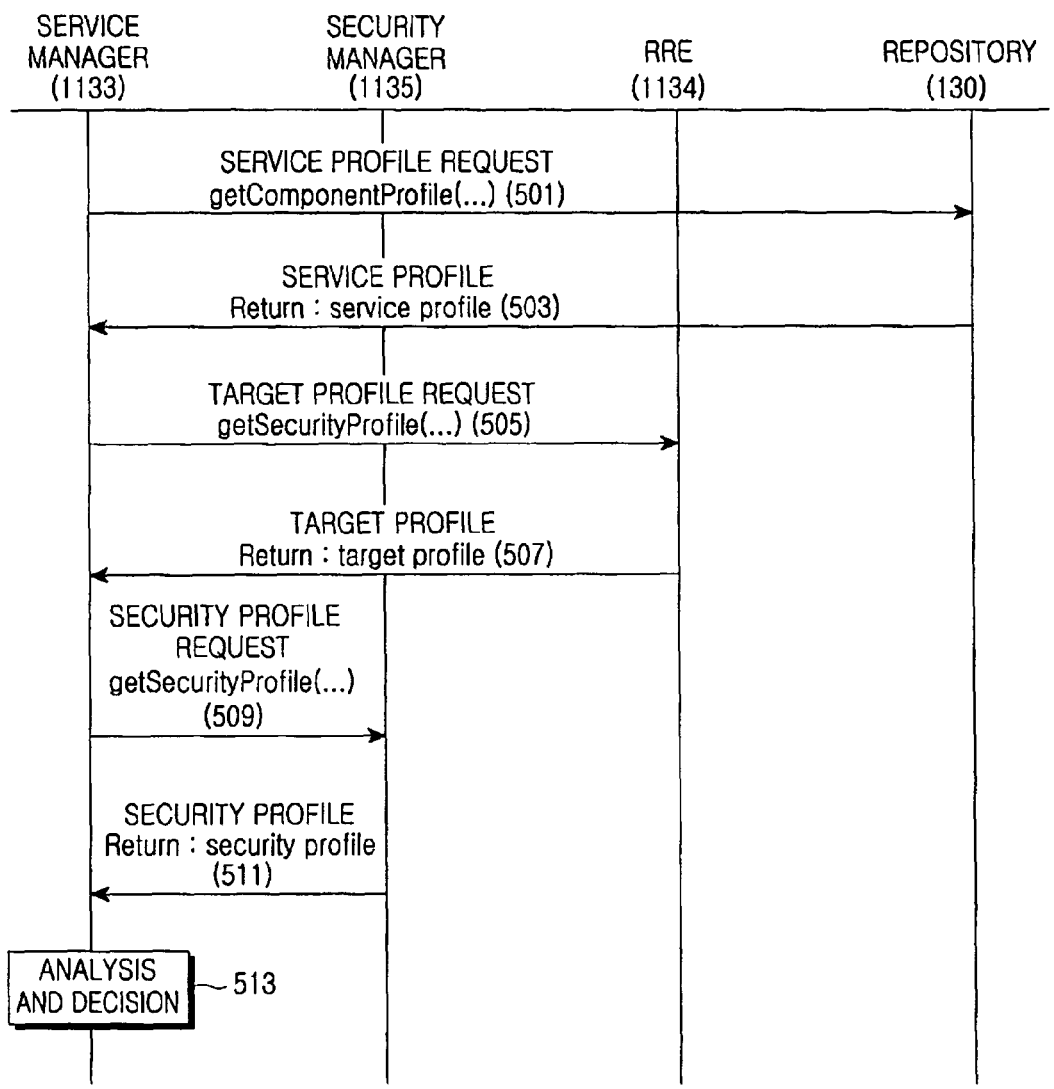
FIG. 5 is a flowchart illustrating a detailed operation of the Decision Sub-process of FIG. 3.

FIG. 5 is a flowchart illustrating a detailed operation of the Decision Sub-process of FIG. 3.

Through the secure session with the multimedia service provider (repository) 130, which was set up through the Location Sub-process of FIG. 4, the service manager 1133 sends a request for corresponding service information (Service Profile) to the multimedia service provider 130 in step 501, and acquires the corresponding service profile information from the multimedia service provider 130 in step 503. Thereafter, in steps 505 and 507, the service manager 1133 sends a request for execution environment information (Target Profile) for the corresponding service to the RRE 1134 and acquires the execution environment information (Target Profile) from the RRE 1134. In steps 509 and 511, the service manager 1133 sends a request for security information (Security Profile) for the corresponding service to the security manager 1135, and acquires the security information (Security Profile) from the security manager 1135. The security information (Security Profile) can be determined, for example, through the negotiation performed in steps 409 and 411 between the terminal and the external entity.

Thereafter, in step 513, by analyzing the acquired service information, execution environment information and the security information, the service manager 1133 determines whether the new service requested by the user coincides with the current execution environment resources, and whether the security information is valid, and then determines whether to download the corresponding service.

Figure 6:
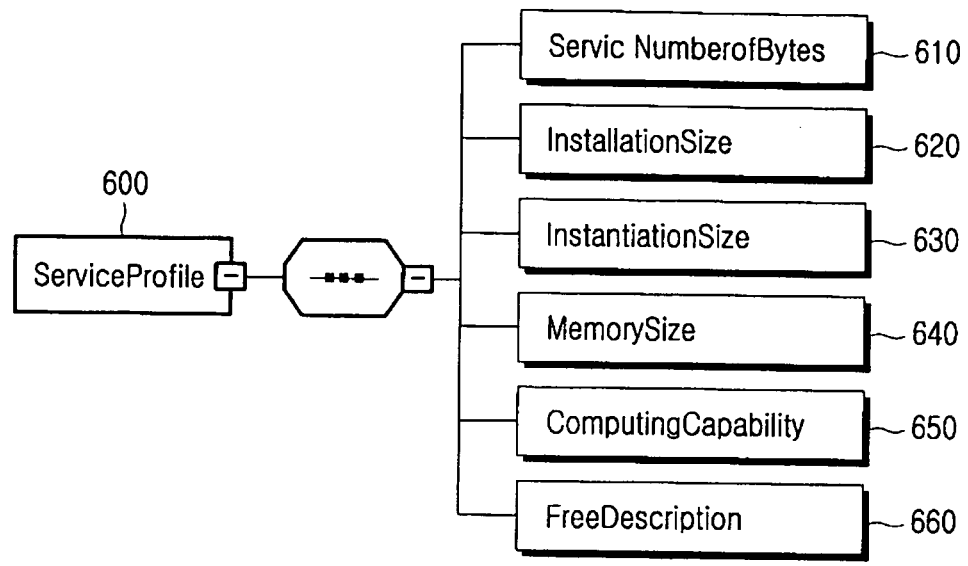
FIG. 6 is a diagram illustrating a data structure of the service information (Service Profile) described in FIG. 5.

FIG. 6 is a diagram illustrating a data structure of the service information (Service Profile) described in FIG. 5.

Referring to FIG. 6, service information (Service Profile) 600 according to the present invention includes size information (ServiceNumberofBytes) 610 of a service to be transmitted from the multimedia service provider 130 to the user terminal 110, capacity information (InstallationSize) 620 of a disk required for installation of the service, size (InstantiationSize) 630 (i.e. a physical size of at least one execution file related to the service profile) of resources necessary for service execution, capacity information (MemorySize) 640 of a memory required for execution of the service, computing specification information (ComputingCapability) 650 specifying the CPU and OS specifications required for execution of the service, and description information (FreeDescription) 660 describing other requirements related to the corresponding service.

Figure 7:
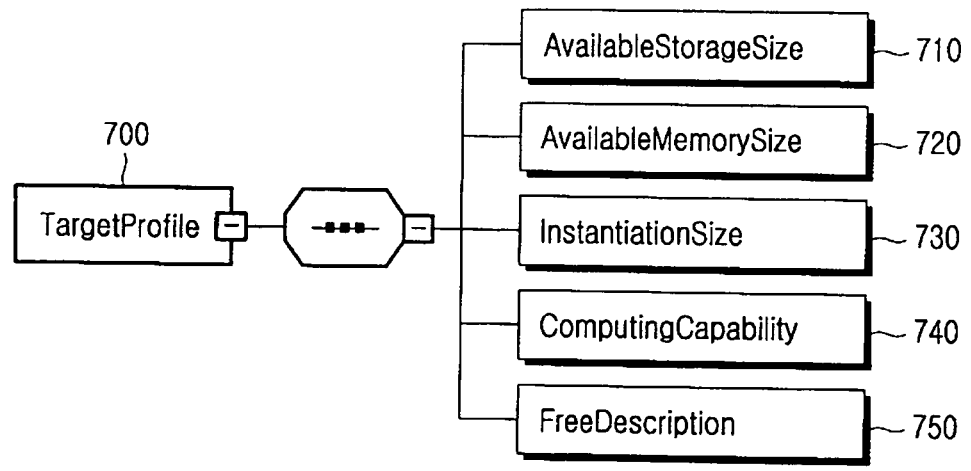
FIG. 7 is a diagram illustrating a data structure of the execution environment information (Target Profile) described in FIG. 5.

FIG. 7 is a diagram illustrating a data structure of the execution environment information (Target Profile) described in FIG. 5. Referring to FIG. 7, execution environment information (Target Profile) 700 according to the present invention includes available storage space information (AvailableStorageSize) 710, available memory capacity information (AvailableMemorySize) 720, size information (InstantiationSize) 730 of resources necessary for service execution, computing specification information (ComputingCapability) 740 specifying the CPU and OS specifications, and description information (FreeDescription) 750 describing other requirements related to the corresponding service.

Figure 8:
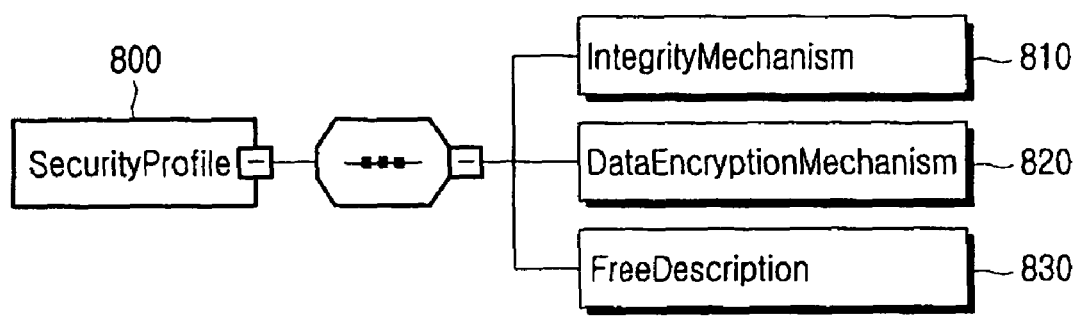
FIG. 8 is a diagram illustrating a data structure of the security information (Security Profile) described in FIG. 5.

FIG. 8 is a diagram illustrating a data structure of the security information (Security Profile) described in FIG. 5. Referring to FIG. 8, security information (Security Profile) according to the present invention includes integrity mechanism information (IntegrityMechanism) 810 for a digital signature algorithm, data encryption algorithm information (DataEncryptionAlgorithm) 820, and description information (FreeDescription) 830 describing other requirements related to the corresponding service.

Figure 9:
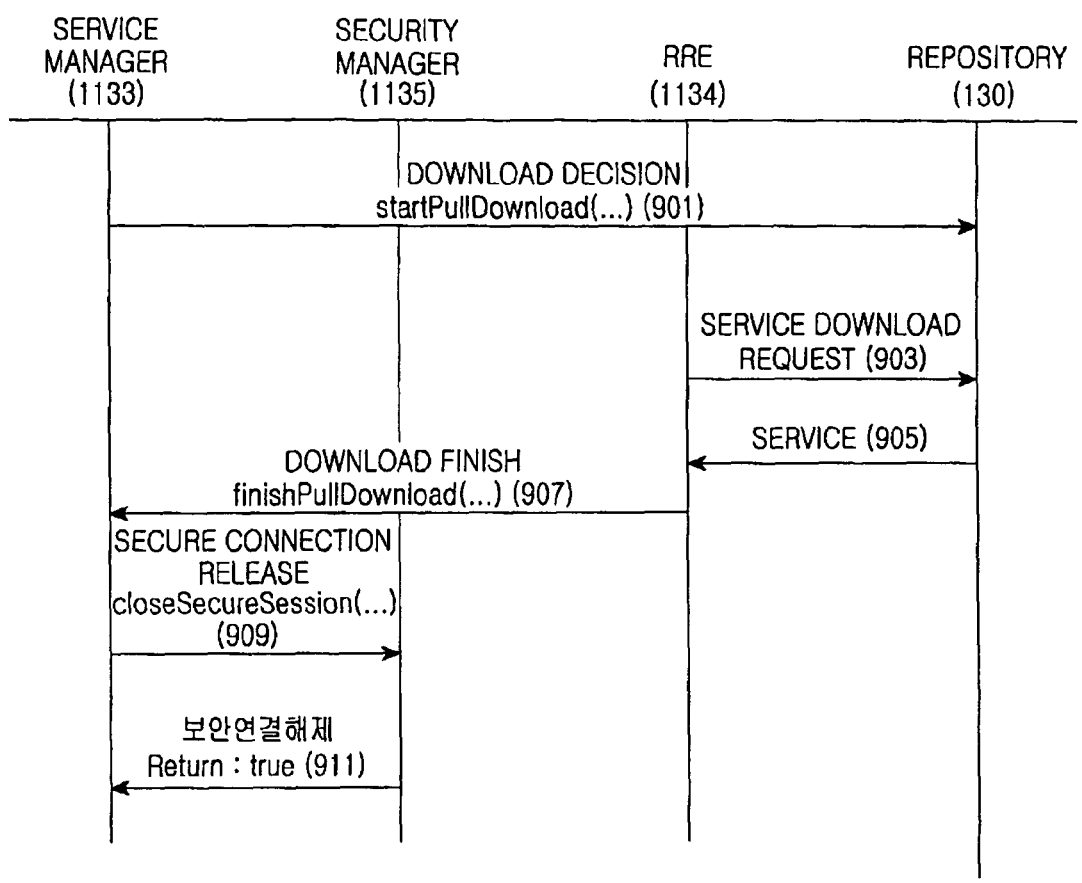
FIG. 9 is a flowchart illustrating a detailed operation of the Transfer Sub-process in FIG. 3.

FIG. 9 is a flowchart illustrating a detailed operation of the Transfer Sub-process in FIG. 3.

If the service manager 1133 determines to download the corresponding service in the Decision Sub-process of FIG. 5, the RRE 1134 receives the download decision from the service manager 1133 in step 901, and sends a download request for the corresponding service to the multimedia service provider (repository) 130 in step 903, thereby starting the Transfer Sub-process. Then the service manager 1133 transfers a right for the secure session to the RRE 1134, and the RRE 1134 sends a signal indicating the ready to receive the service to the multimedia service provider 130

In step 905, upon receipt of the ready-to-receive signal, the multimedia service provider 130 sends the corresponding service to the terminal. In step 907, if the download of the service ends, the RRE 1134 provides the corresponding information to the service manager 1133. Thereafter, in step 909, the service manager 1133 sends a close request for the secure session to the security manager 1135. In step 911, the security manager 1135 closes the secure session established according to procedure of FIG. 4 and provides information indicating the release of the secure connection to the service manager 1133.

With reference to FIGS. 10 to 15, a description will now be made of a metadata structure that has defined the security protocol and algorithm of the present invention, such that a terminal including multimedia middleware performs a security procedure which may occur during communication with the multimedia service provider, which is an external entity.

Generally, the metadata, which is systematized data, i.e. data for describing other data, means data added to multimedia content according to a stated rule in order to efficiently search for desired information from a large amount of information.

Figure 10:
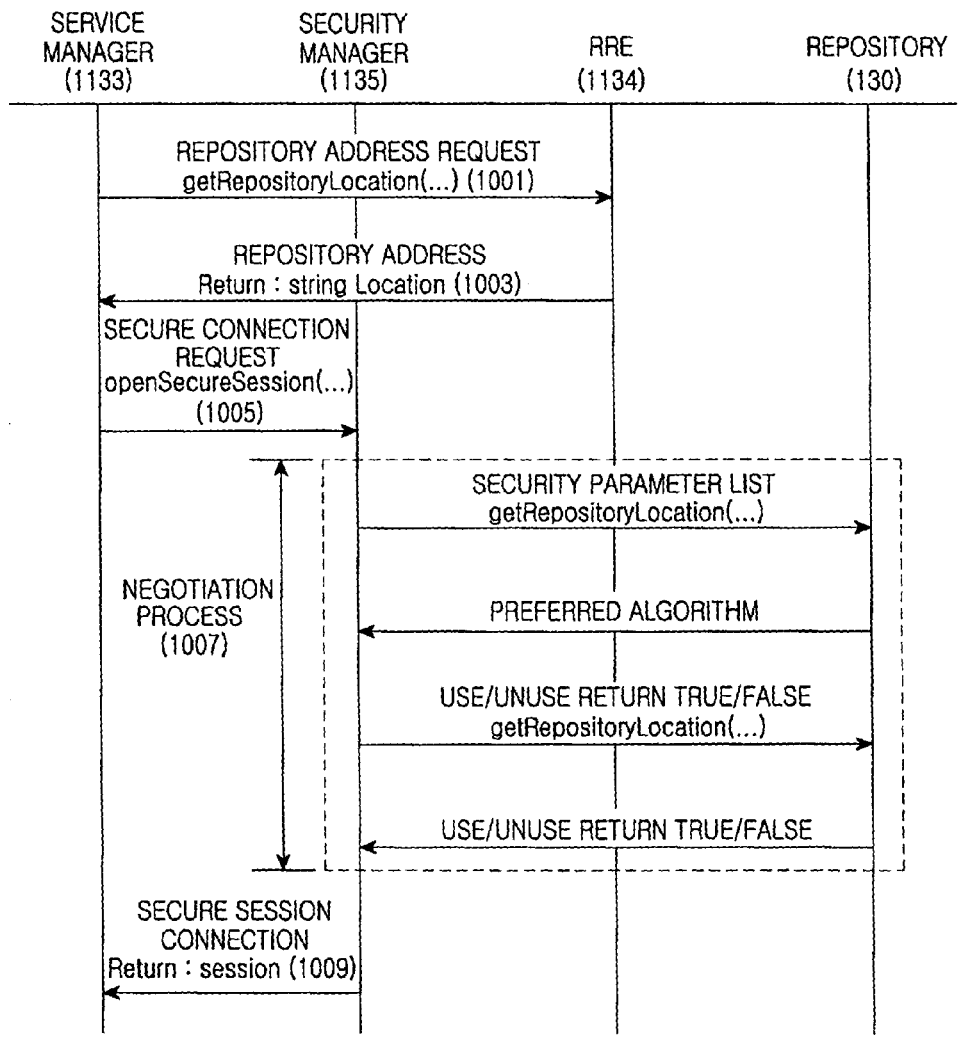
FIG. 10 is a flowchart illustrating a negotiation process for communication with an external entity according to the present invention.

FIG. 10 is a flowchart illustrating a negotiation process for communication with an external entity according to the present invention.

Referring first to FIG. 2, even though the service application processing block 111 of the user terminal 110 has sent an access request for a particular service to the service manager 1133 in the multimedia middleware block 113, if there is no corresponding service in the middleware, the service manager 1133 first undergoes a download process for acquisition of the corresponding service. Referring to FIG. 10, in the download process, in steps 1001 and 1003, the service manager 1133 sends a network address request for the multimedia service provider (repository) 130 to the RRE 1134 in the same manner as the operation (Location Sub-process) of step 303, and receives the network address of the corresponding multimedia service provider 130.

Thereafter, in step 1005, the service manager 1133 sends a request for a secure connection to the security manager 1135 before it downloads the corresponding service from the multimedia service provider 130. In steps 1007 and 1009, the security manager 1135 sets up a communication channel through a negotiation procedure for secure session setup with the multimedia service provider 130. In step 1007, the security manager 1135 requests the negotiation by transmitting a list of security algorithms and protocols to the multimedia service provider 130 or a security management means (not shown) of the multimedia service provider 130. The multimedia service provider 130 receiving the list selects its preferred algorithm and protocol by analyzing the security algorithm and protocol list used by the entity from which the negotiation request was received, and then sends a response. This algorithm and protocol negotiation is repeated until the negotiation is completed.

Figure 11:
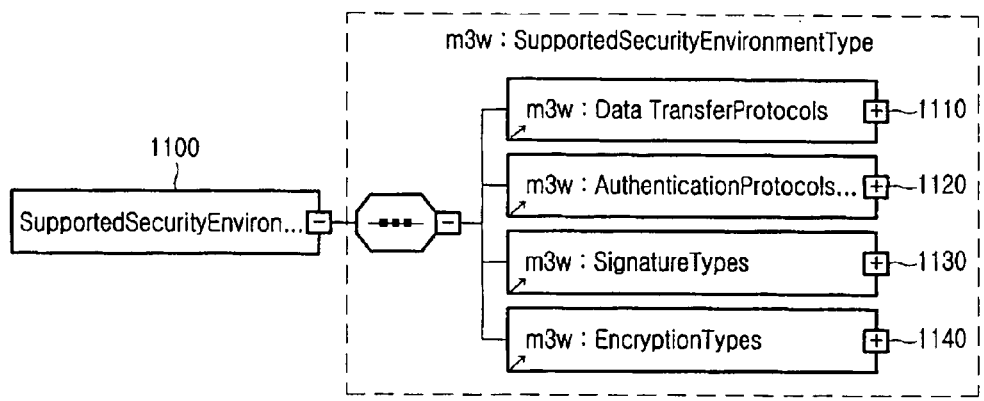
FIG. 11 is a diagram illustrating the overall structure of metadata that has defined a security protocol and algorithm according to the present invention.

FIG. 11 is a diagram illustrating the overall structure of metadata that has defined a security protocol and algorithm according to the present invention.

Referring to FIG. 11, a brief definition is given of a data structure of metadata 1100 that includes Data Transfer Protocols 1110 used for service exchange between the user terminal 110 and the multimedia service provider 130, Authentication Protocols 1120, Signature Types 1130 and Encryption Types 1140.

The security manager 1135 of FIG. 2 transmits the metadata 1100 defined in FIG. 11 to the multimedia service provider 130, selects its preferred algorithm and protocol through the negotiation procedure according to step 1007 of FIG. 10, and sets up a secure channel using the selected algorithm and protocol.

Figure 12:
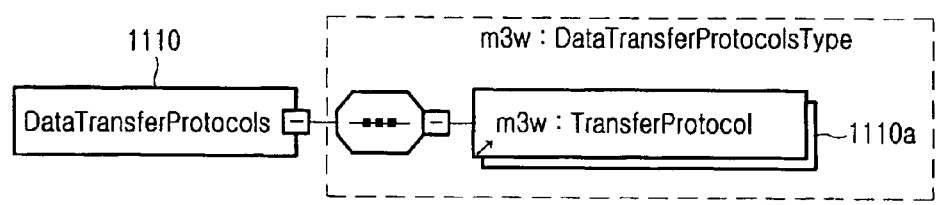
FIG. 12 is a diagram illustrating a metadata structure of the Data Transfer Protocols in FIG. 11.

FIG. 12 is a diagram illustrating a metadata structure of the Data Transfer Protocols 1110 in FIG. 11, and this specifies a list of data transfer protocols 1110a supported by the multimedia middleware of the present invention.

Referring to FIG. 12, the list of the transfer protocols 1110a can be enumerated from 1 to infinity, and each protocol is composed of a pair of Uniform Resource Identifiers (URIs) and preferences of the protocol algorithm recommended in World Wide Web Consortium (W3C). The preference of the protocol is expressed with an integer, and for the protocol preferred by the corresponding middleware, the preference has a greater integer.

Figure 13:
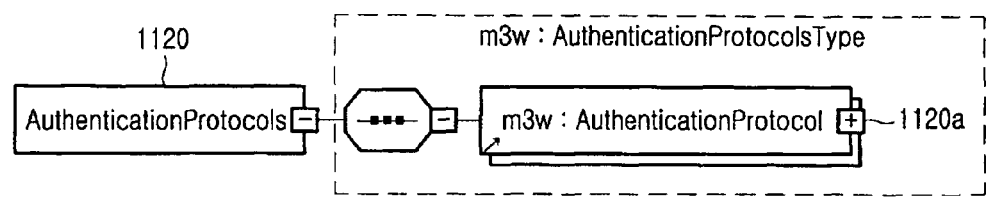
FIG. 13 is a diagram illustrating a metadata structure of the Authentication Protocols in FIG. 11.

FIG. 13 is a diagram illustrating a metadata structure of the Authentication Protocols 1120 in FIG. 11, and this specifies a list of authentication protocols 1120a supported by the multimedia middleware of the present invention.

Referring to FIG. 13, the list of the authentication protocols 1120a can be enumerated from 1 to infinity, and each protocol is composed of a pair of URIs and preferences of the protocol algorithm recommended in W3C. The preference of the protocol is expressed with an integer, and for the authentication algorithm preferred by the corresponding middleware, the preference has a greater integer.

Figure 14:
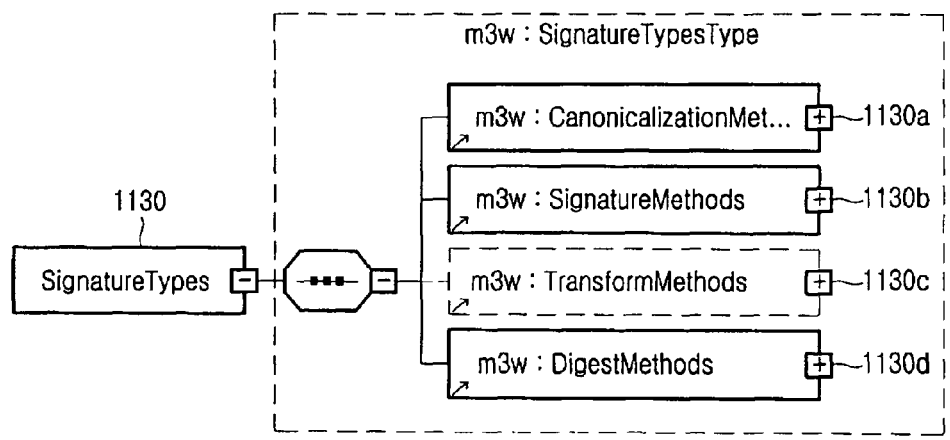
FIG. 14 is a diagram illustrating a metadata structure of the Signature Types 1130 in FIG.

FIG. 14 is a diagram illustrating a metadata structure of the Signature Types 1130 in FIG. 11, and this specifies a list of signatures supported by the multimedia middleware of the present invention.

The Signature Types 1130 of FIG. 14 includes an algorithm list for each of Canonicalization Methods 1130a, Signature Methods 1130b, Transform Methods 1130c, and Digest Methods 1130d.

It is noted that the Transform Methods 1130c shown by a dotted line are optional. The Canonicalization Methods 1130a is a list of Canonicalization Algorithms used for electronic signatures provided by the middleware. The Signature Methods 1130b is a list of signature generation and verification algorithms provided by the middleware, the Transform Methods 1130c is a list of Transform Method algorithms for electronic signatures provided by the middleware, and the Digest Methods 1130d is a list of Digest algorithms for electronic signatures provided by the middleware. Each of the algorithm lists can be enumerated from 1 to infinity, and each list is composed of a pair of URIs and preferences of the protocol algorithm. The preference of the protocol is expressed with an integer, and for the electronic signature algorithm preferred by the corresponding middleware, the preference has a greater integer.

Figure 15:
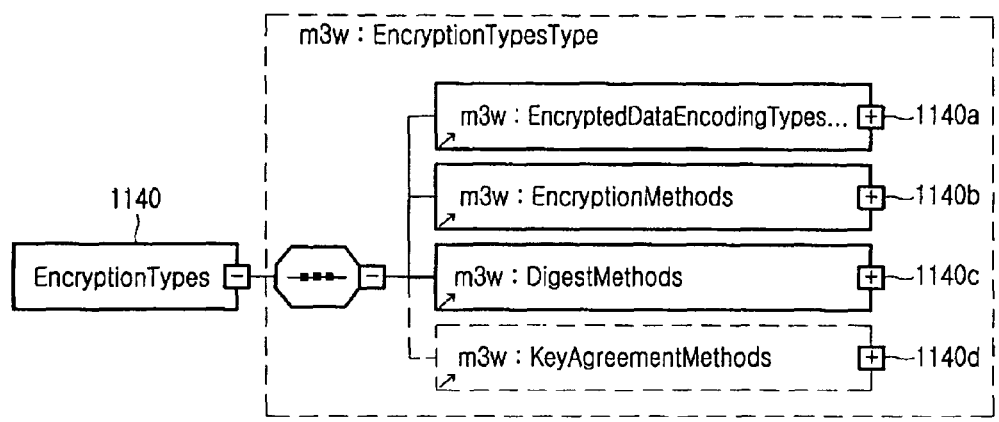
FIG. 15 is a diagram illustrating a metadata structure of the Encryption Types in FIG. 11.

FIG. 15 is a diagram illustrating a metadata structure of the Encryption Types 1140 in FIG. 11, and this specifies a list of encryption algorithms supported by the multimedia middleware of the present invention.

Referring to FIG. 15, a list of the Encryption Types 1140 includes an algorithm list for each of Encrypted Data Encoding Types 1140a, Encryption Methods 1140b, Digest Methods 1140c, and Key Agreement Methods 1140d. It is noted that the Key Agreement Methods 1140d shown by a dotted line are optional. Each of the encryption algorithm lists can be enumerated from 1 to infinity, and each list is composed of a pair of URIs and preferences of the encryption algorithm. The preference of the algorithm is expressed with an integer, and for the encryption algorithm preferred by the corresponding middleware, the preference has a greater integer.

Table 1 to Table 4 below illustrate the exemplary overall structure of the security data of FIG. 11 defined in the present invention, with eXtensible Markup Language (XML) description.

TABLE 1

```
<?xml version="1.0" encoding="UTF-8"?>
<schema targetNamespace="http://mccb.icu.ac.kr/M3WSecManProfile"
xmlns:m3w="http://
mccb.icu.ac.kr/M3WsecManProfile"
xmlns="http://www.w3.org/2001/XMLSchema"
elementFormDefault="qualified" attributeFormDefault="unqualified">
    <element name="SupportedSecurityEnvironment" type="
    SupportedSecurityEnvironmentType"/>
    <complexType name=" SupportedSecurityEnvironmentType ">
        <sequence>
            <element ref="m3w:DataTransferProtocols"/>
            <element ref="m3w:AuthenticationProtocols"/>
            <element ref="m3w:SignatureTypes"/>
            <element ref="m3w:EncryptionTypes"/>
        </sequence>
    </complexType>
```

TABLE 1-continued

```
    <element name="DataTransferProtocols"
    type="m3w:DataTransferProtocolsType" />
    <complexType name="DataTransferProtocolsType">
        <sequence>
            <element ref="m3w:TransferProtocol"
            maxOccurs="unbounded"/>
        </sequence>
    </complexType>
    <element name="AuthenticationProtocols"
    type="m3w:AuthenticationProtocolsType" />
    <complexType name=" AuthenticationProtocolsType">
        <sequence>
            <element ref="m3w: AuthenticationProtocol"
            maxOccurs="unbounded"/>
        </sequence>
```

TABLE 2

```
</complexType>
    <element name="TransferProtocols" type="m3w:MethodType" />
    <element name="AuthenticationProtocols"
    type="m3w: MethodType" />
    <element name="Method" type="m3w: MethodType" />
    <complexType name="MethodType">
        <attribute name="algorithm" thpe="anyURI"
        use="required"/>
        <attribute name="preference" thpe="Integer"
        use="required"/>
    </complexType>
    <element name="SignatureTypes" type="m3w:
    SignatureTypesType" />
    <complexType name=" SignatureTypesType">
        <sequence>
            <element ref="m3w:CanonicalizationMethods"/>
            <element ref="m3w:SignatureMethods"/>
            <element ref="m3w: TransformMethods" minOccurs="0"/>
            <element ref="m3w:DigestMethods"/>
        </sequence>
    </complexType>
    <element name="CanonicalizationMethods"
    type="m3w:CanonicalizationMethodsType" />
    <complexType name="CanonicalizationMethodsType">
        <sequence>
            <element ref="m3w:Method" maxOccurs="unbounded"/>
        </sequence>
```

TABLE 3

```
</complexType>
    <element name=" SignatureMethods" type="m3w:
    SignatureMethodsType" />
    <complexType name=" SignatureMethodsType">
        <sequence>
            <element ref="m3w:Method" maxOccurs="unbounded"/>
        </sequence>
    </complexType>
    <element name="TransformMethods"
    type="m3w:TransformMethodsType" />
    <complexType name="TransformMethodsType">
        <sequence>
            <element ref="m3w:Methods" maxOccurs="unbounded"/>
        </sequence>
    </complexType>
    <element name=" DigestMethods" type="m3w:
    DigestMethodsType"/>
    <complexType name="DigestMethodsType">
        <sequence>
            <element ref="m3w:Methods" maxOccurs="unbounded"/>
        </sequence>
    </complexType>
    <element name="EncryptionTypes" type="m3w:
    EncryptionTypesType"/>
    <complexType name=" EncryptionTypesType">
        <sequence>
            <element ref="m3w:
```

TABLE 3-continued

```
        EncryptedDataEncodingTypes"/>
        <element ref="m3w:EncryptionMethods"/>
        <element ref="m3w:DigestMethods"/>
        <element ref="m3w:KeyAgreementMethods"
        minOccurs="0"/>
    </sequence>
```

TABLE 4

```
</complexType>
    <element name="EncryptedDataEncodingTypes"
    type="m3w:EncryptedDataEncodingTypesType"/>
    <complexType name="EncryptedDataEncodingTypesType" >
        <sequence>
            <element ref="m3w: EncryptedDataEncodingType"
            maxOccurs="unbounded"/>
        </sequence>
    </complexType>
    <element ref="EncryptedDataEncodingType"
    type="m3w:MethodType"/>
    <element ref="EncryptionMethods"
    type="m3w:EncryptionMethodsType"/>
    <complexType name="EncryptionMethodsType" >
        <sequence>
            <element ref="m3w: Method"
            maxOccurs="unbounded"/>
        </sequence>
    </complexType>
    <element ref="m3w:KeyAgreementMethods"
```

TABLE 4-continued

```
    type="m3w:KeyAgreementMethodsType"/>
    <complexType name="m3w:KeyAgreementMethodsType">
        <sequence>
            <element ref="m3w: Method"
            maxOccurs="unbounded"/>
        </sequence>
    </complexType>
</schema>
```

Table 5 to Table 7 below illustrate an exemplary list of the security data having the metadata structure of FIG. 11 defined in the present invention, with XML description.

TABLE 5

```
<?xml version="1.0" encoding="UTF-8"?>
<SupportedSecurityEnvironment
xmlns="http://mccb.icu.ac.kr/M3WSecManProfile"
xmlns:xsi="http://www.w3.org/2001/XMLSchema-instance"
xsi:schemaLocation=="http://mccb.icu.ac.kr/M3WSecManProfile
M3WSecManProfile.xsd">
    <DataTransferProtocols>
        <TransferProtocol algorithm="http" preference="1"/>
    <DataTransferProtocols>
    <AuthenticationProtocols>
        <AuthenticationProtocols algorithm="myAuthenticationMethod"
        preference="1"/>
    </AuthenticationProtocols>
```

TABLE 6

```
<SignatureTypes>
    <CanonicalizationMethods>
        <Method algorithm="http://www.w3.org/TR/2001/REC-xml-c14n-20010315" preference="2"/>
        <Method algorithm="http://www.w3.org/TR/2001/10/xml-exc14n#" preference="1"/>
    </CanonicalizationMethods>
    <SignatureMethods>
        <Method algorithm="http://www.w3.org/2000/09/xmldsig#dsa-sha 1" preference="2"/>
        <Method algorithm="http://www.w3.org/2000/09/xmldsig#rsa-sha 1" preference="1"/>
    </SignatureMethods>
    <TransformMethods>
        <Method algorithm="http://www.w3.org/TR/1999/REC-xslt-19991116" preference="1"/>
        <Method algorithm="http://www.w3.org/TR/1999/REC-xpath-19991116" preference="1"/>
    </TransformMethods>
    <DigestMethods>
        <Method algorithm="http://www.w3.org/2000/09/xmldsig#sha 1" preference="1"/>
    </DigestMethods>
<SignatureTypes>
```

TABLE 7

```
<EncryptionTypes>
    <EncryptedDataEncodingTypes>
        <EncryptedDataEncodingType algorithm="http://www.w3.org/2000/09/xmldsig#base64" preference="1"/>
    </EncryptedDataEncodingTypes>
    <EncryptionMethods>
        <Method algorithm="http://www.w3.org/2001/04/xmlenc#triptedes-cbc" preference="1"/>
        <Method algorithm="http://www.w3.org/2001/04/xmlenc#aes128-cbc" preference="2"/>
        <Method algorithm="http://www.w3.org/2001/04/xmlenc#rsa-1_5" preference="3"/>
        <Method algorithm="http://www.w3.org/2001/04/xmlenc#rsa-oaep-mgflp" preference="4"/>
    </EncryptionMethods>
    <DigestMethods>
        <Method algorithm="http://www.w3.org/2000/09/xmldsig#sha 1" preference="1"/>
    <KeyAgreementMethods>
        <Method algorithm="http://www.w3.org/2001/04/xmlenc#dh" preference="1"/>
    </KeyAgreementMethods>
</EncryptionTypes>
</SupportedSecurityEnvironment>
```

The program or algorithm that provides open middleware enabling efficient management of the metadata structure for the multimedia middleware service of the present invention can be stored in a storage medium that can be installed or mounted in a particular apparatus, and the data in the storage medium can be read using an apparatus such as a computer.

Figure 16:
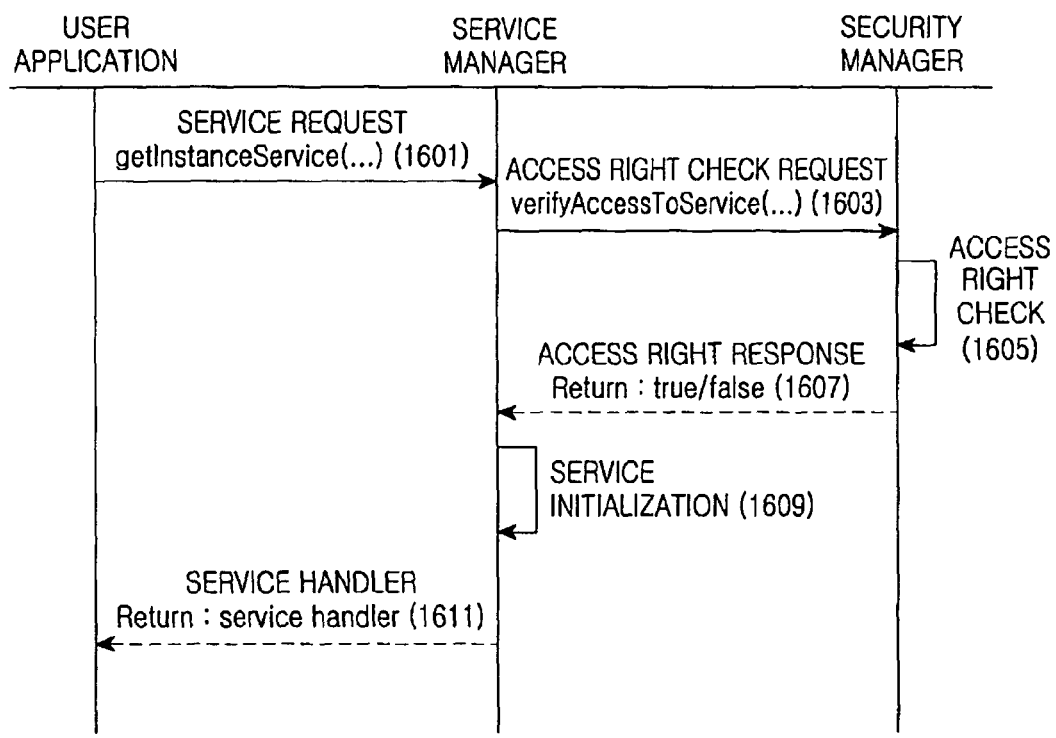
FIG. 16 is a flowchart illustrating a security process during access to an internal service in a multimedia middleware apparatus according to the present invention.
Figure 17:
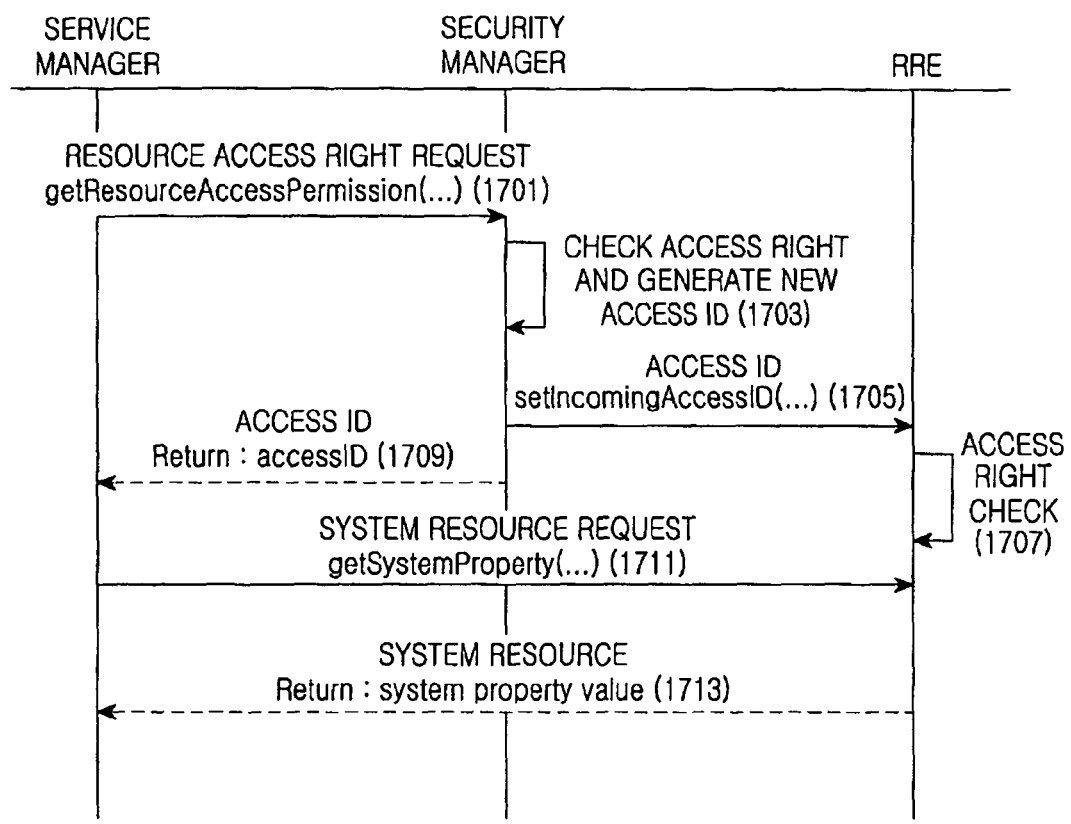
FIG. 17 is a flowchart illustrating a security process during access to an internal resource in a multimedia middleware apparatus according to the present invention.

With reference to FIGS. 16 and 17, a description will now be made of an operation of performing Governed Access through License List management during internal service or internal resource access in the middleware structure of the present invention. To this end, in addition to the security management for communication with an external entity, the security manager 1135 of FIG. 2 not only takes charge of security maintenance and management for an internal service through a security procedure when an application program executed in an upper layer accesses an internal service, i.e. middleware service, through the service application processing block 111, but also takes charge of security maintenance and management of internal resources through the security procedure when the middleware service accesses the platform block 115 including the internal resources.

The internal service, which is a kind of middleware program provided by the middleware needed by a user application, is a software concept, and the internal resource is a hardware concept such as a memory of a platform needed by the middleware while performing a service.

FIG. 16 is a flowchart illustrating a security process during access to an internal service in a multimedia middleware apparatus according to the present invention.

Referring to FIG. 16, the security manager 1135 takes charge of internal security maintenance and management through a security procedure when the service application processing block 111 for processing a multimedia service requests a particular service in middleware. Therefore, upon receipt of a request for a multimedia service from a user, the service application processing block 111 sends a request for execution of a new service to the service manager 1133 in step 1601. In order to check an access right for the corresponding service, the service manager 1133 sends a check request for the access right to the security manager 1135 in step 1603. The security manager 1135 checks in step 1605 whether the service application processing block 111 has an access right for the corresponding service by checking a license list in which an access right is expressed, and sends a response including the result to the service manager 1133 in step 1607. The service manager 1133 initializes the corresponding service in step 1609 according to the response result provided in step 1607 from the security manager 1135, and transfers a handler for the corresponding service to the service application processing block 111 in step 1611. Through this process, the service manager 1133 can check whether the requested service can be processed in the corresponding application program.

Therefore, the security manager 1135 should have a license list for an access right according to the present invention, and can check an access right for the requested service and provide a response to the result to the service manager 1133. In addition, the service manager 1133 inquires of the security manager 1135 about the access right upon receipt of every request for a particular service from the service application processing block 111, and then can or cannot provide the service according to the result.

FIG. 17 is a flowchart illustrating a security process during access to an internal resource in a multimedia middleware apparatus according to of the present invention.

Referring to FIG. 17, for access to a particular platform, a particular service first sends a request for a new resource access right to the security manager 1135 in step 1701. Then the security manager 1135 generates a new access ID in step 1703 by checking an access policy list, and provides information indicating the issuance of the new access ID to the RRE 1134 in step 1705. The RRE 1134 checks the access request in step 1707 by checking the license list in which the access right is expressed. In addition, the security manager 1135, after providing information indicating the issuance of the new access ID to the RRE 1134 in step 1705, provides the new access ID to the service in step 1709. The service receiving the new access ID sends an access request for a particular platform resource to the RRE 1134 in step 1711. Then the RRE 1134 provides a response to the access request in step 1713. The license list to which the security manager 1135 makes reference in FIG. 16 can be the same as the license list to which the RRE 1134 makes reference in FIG. 17.

Figure 18:
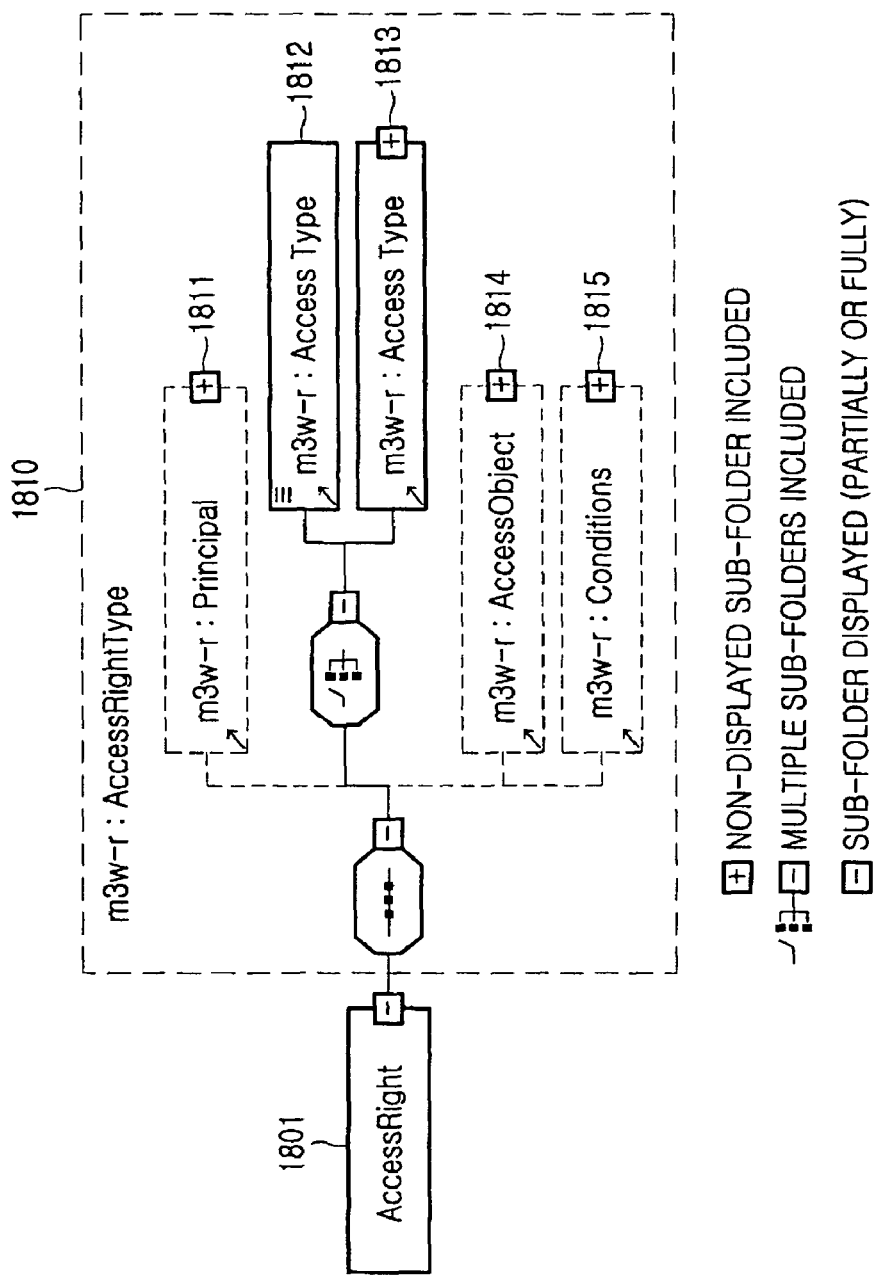
FIG. 18 is a diagram illustrating the overall data structure for access right expression according to the present invention.

FIG. 18 is a diagram illustrating the overall data structure for access right expression according to of the present invention. With reference to FIG. 18, a description will now be made of the overall data structure for access right expression according to of the present invention.

Referring to FIG. 18, the overall structure of an access right (AccessRight) 1801 is shown. A lower layer of the access right (AccessRight) 1801 includes a principal (M3W-r:Principal) 1811 indicating an access principal (Principal) for storage of the multimedia middleware, access types (M3W-r:AccessTypes) 1812 and 1813 of the multimedia middleware, an access object (M3W-r:AccessObject) 1814 of the multimedia middleware, and access conditions (M3W-r:Conditions) 1815 of the multimedia middleware.

A description of notations shown in an access right type (AccessRightType) 1810 is added to the bottom of FIG. 18. That is, the drawing shows the case where a non-displayed sub-folder(s) is included or a plurality of sub-folders are included, and the case where the sub-folders are displayed partially or fully. In addition, a line connected to the access right (AccessRight) 1801 is shown together with a notation indicating the presence of a plurality of rights.

Figure 19:
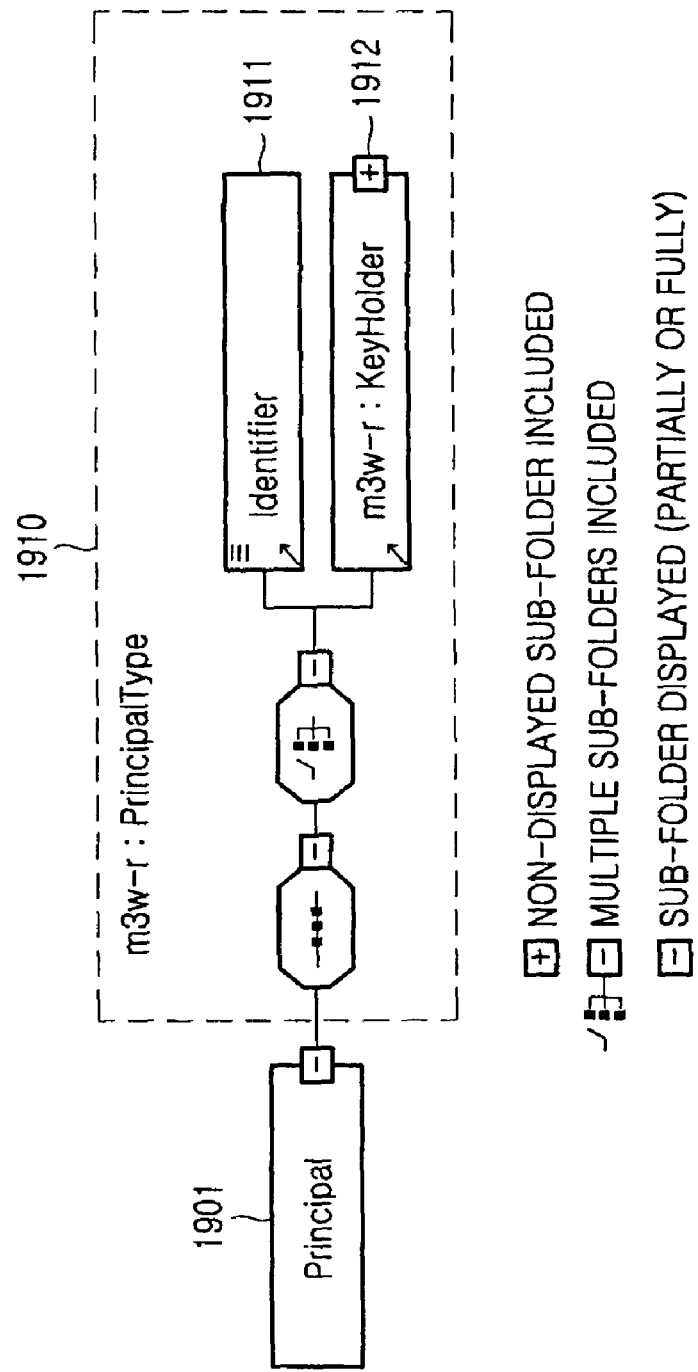
FIG. 19 is a diagram illustrating a data structure for expression of an access principal (Principal) according to the present invention.

FIG. 19 is a diagram illustrating a data structure for expression of an access principal (Principal) according to the present invention.

An access-granted principal is specified in the data structure for the access principal (Principal), i.e. principal type (PrincipalType) 1910, shown in FIG. 19. The Principal can be the application program or the service described in FIGS. 16 and 17. The data structure for expressing the Principal includes an ID (Identifier) 1911 for the Principal, and granted key information (KeyHolder) 1912 generated from an electronic signature method.

Figure 20:
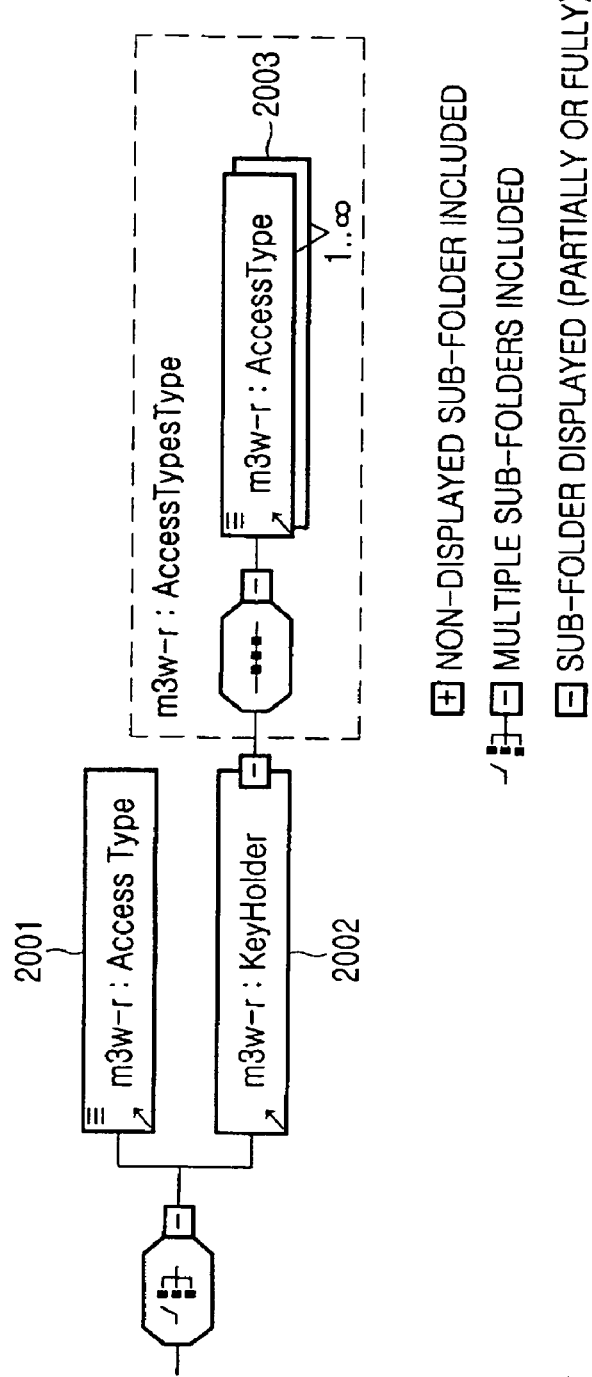
FIG. 20 is a diagram illustrating a data structure for expressing access types (AccessType) according to the present invention.

FIG. 20 is a diagram illustrating a data structure for expressing access types (AccessType) according to the present invention.

Referring to FIG. 20, reference numerals 2001 and 2002 specify access types granted to the Principal. The access type can be granted one type or a plurality of types. That is, in an access type denoted by reference numeral 2003, there is shown that a plurality of types can be granted to the service application processing block 111. For example, each type can have Open, Write, Read, and Execute values.

Figure 21:
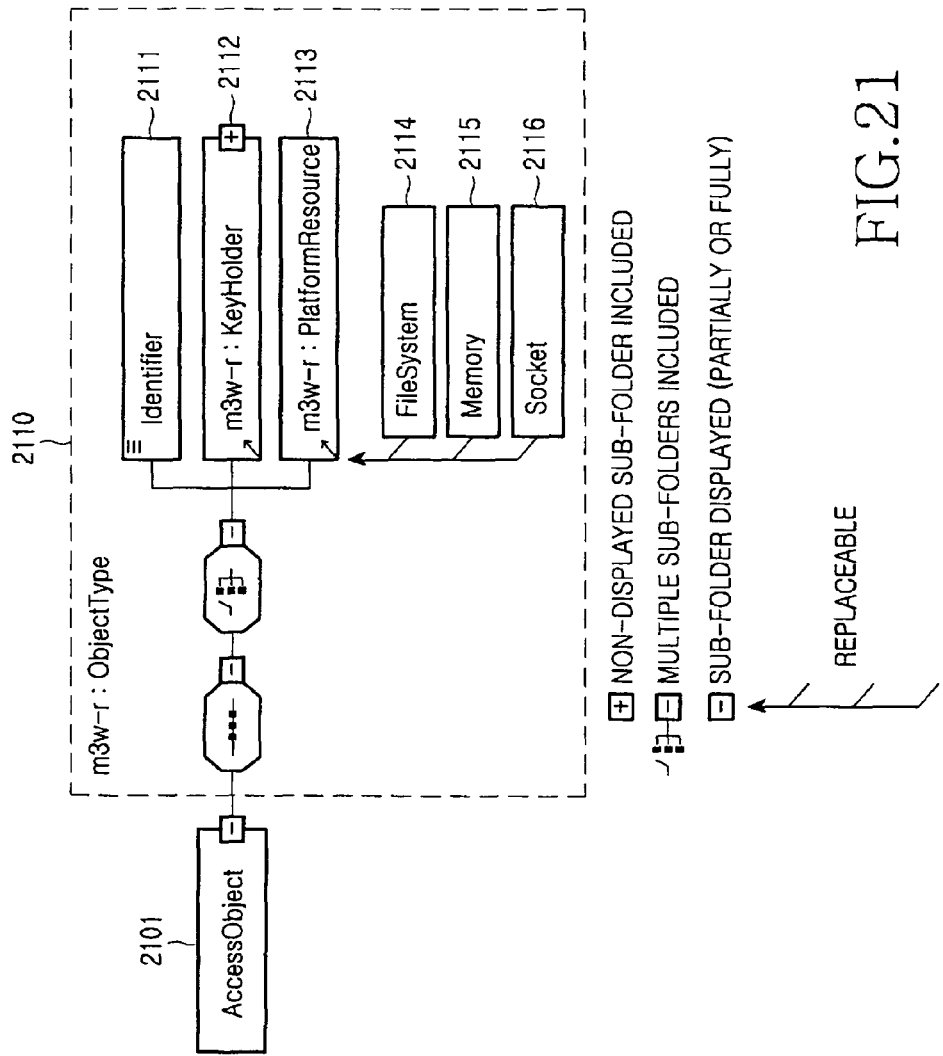
FIG. 21 is a diagram illustrating a data structure for expressing an access object (AccessObject) according to the present invention.

FIG. 21 is a diagram illustrating a data structure for expressing an access object (AccessObject) according to the present invention.

Referring to FIG. 21, an access object granted to the Principal is specified. An access object (AccessObject) 2101 can be a service or a platform resource. The data for expressing the access object includes an ID (Identifier) 2111 of the access object, granted key information (KeyHolder) 2112 generated from an electronic signature method, and platform resources (PlatformResources) 2113. In FIG. 21, the platform resources (PlatformResources) 2113 can be replaced with actual resources such as a file system (FileSystem) 2114, Memory 2115, and Socket 2116.

Figure 22:
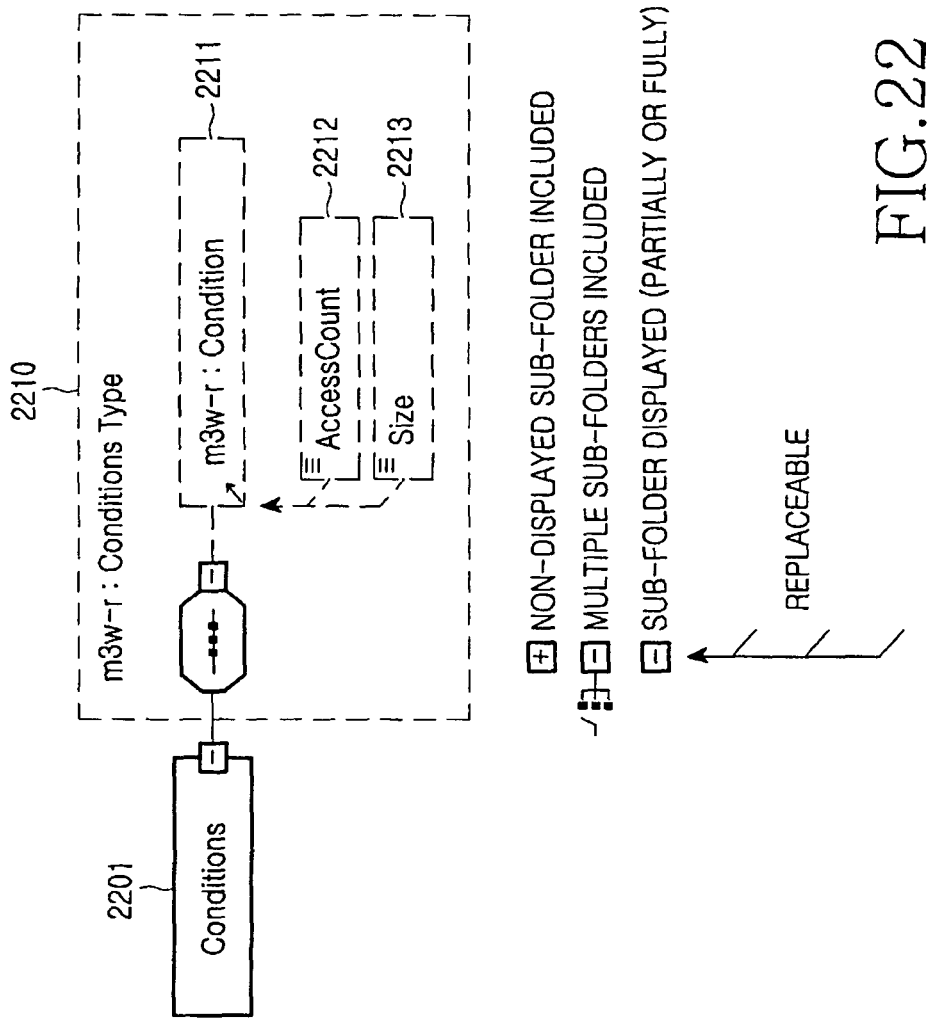
FIG. 22 is a diagram illustrating a data structure for expressing access conditions (Conditions) according to the present invention.

FIG. 22 is a diagram illustrating a data structure for expressing access conditions (Conditions) according to the present invention.

Referring to FIG. 22, Conditions 2201 on which a granted Principal can access the access object is specified. A detailed example of the Conditions is shown by reference numeral 2210. A Condition 2211 can be replaced with Size 2213 that specifies accessible file system and memory size in bytes, or with an access count (AccessCount) 2212 that specifies an accessible count.

Figure 23:
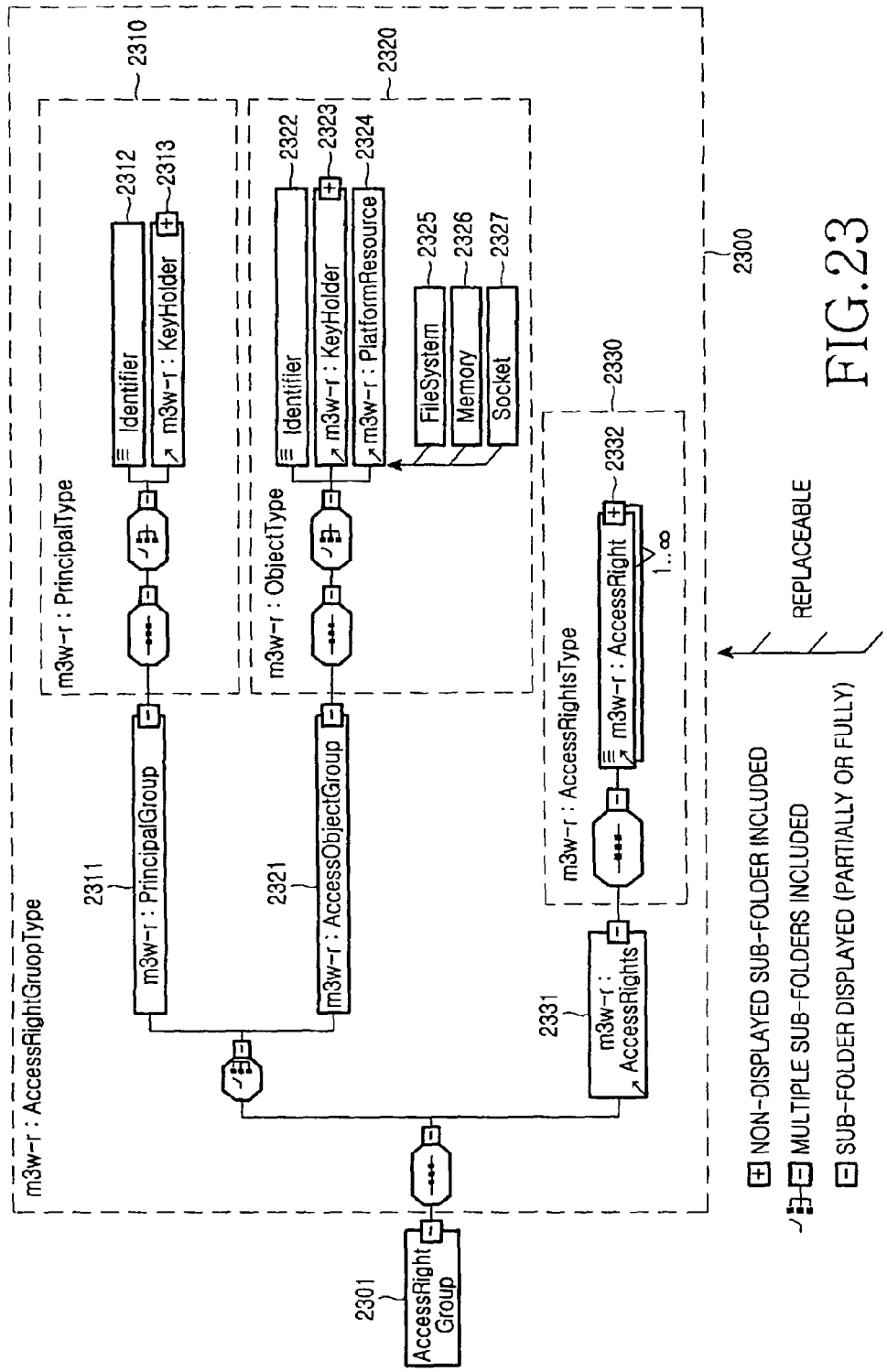
FIG. 23 is a diagram illustrating the overall data structure of an access right expression group according to the present invention.

FIG. 23 is a diagram illustrating the overall data structure of an access right expression group according to the present invention.

Referring to FIG. 23, there is shown a data structure for expressing an access right to a plurality of access objects that one Principal can have, or for expressing a group of a plurality of access rights that one access object can have. An access right group (AccessRightGroup) 2301 has one of Principal-Group 2311 and AccessObjectGroup 2321, and AccessRights 2331 described in FIG. 18. That is, the AccessRightGroup 2301, if it has the PrincipalGroup 2311, has a value of AccessObject (see reference numeral 1814 of FIG. 18) but does not have Principal (see reference numeral 1811 of FIG. 18) among the access right expressions. However, if the AccessRightGroup 2301 has the AccessObjectGroup 2321, it has a value of the Principal but does not express the AccessObject among the access right expressions.

Table 8 to Table 11 below illustrate the overall structure of access right expression data of FIG. 18 defined in the present invention, with XML description.

TABLE 8

```
<?xml version="1.0" encoding="UTF-8"?>
<schema
targetNamespace="http://mccb.icu.ac.kr/M3WAccessRightExpression"
    xmlns="http://www.w3.org/2001/XMLSchema"
    xmlns:m3w-r="http://mccb.icu.ac.kr/M3WAccessRightExpression"
    xmlns:dsig="http://www.w3.org/2000/09/xmldsig#"
    elementFormDefault="qualified"
    attributeFormDefault="unqualified">
    <import namespace="http://www.w3.org/2000/09/xmldsig#"
    schemaLocation="dsig.xsd"/>
    <element name="AccessRight"
    type="m3w-r:AccessRightType"/>
    <complexType name="AccessRightType">
        <sequence>
            <element ref="m3w-r:Principal" minOccurs="0"/>
            <choice>
                <element ref="m3w-r:AccessType"/>
                <element ref="m3w-r:AccessTypes"/>
            </choice>
            <element ref="m3w-r:AccessObject"
            minOccurs="0"/>
            <element ref="m3w-r:Conditions" minOccurs="0"/>
        </sequence>
    </complexType>
    <element name="AccessRightGroup"
    type="m3w-r:AccessRightGroupType"/>
    <complexType name="AccessRightGroupType">
        <sequence>
            <choice>
                <element ref="m3w-r:PrincipalGroup"/>
                <element ref="m3w-r:AccessObjectGroup"/>
            </choice>
            <element ref="m3w-r:AccessRights"/>
        </sequence>
    </complexType>
```

TABLE 8-continued

```
    <element name="AccessRights"
    type="m3w-r:AccessRightsType"/>
    <complexType name="AccessRightsType">
        <sequence>
            <element ref="m3w-r:AccessRight"
            maxOccurs="unbounded"/>
        </sequence>
    </complexType>
    <element name="AccessTypes"
    type="m3w-r:AccessTypesType"/>
    <complexType name="AccessTypesType">
        <sequence>
            <element ref="m3w-r:AccessType"
            maxOccurs="unbounded"/>
```

TABLE 9

```
        </sequence>
</complexType>
<element name="AccessType"
type="m3w-r:AccessTypeType"/>
<simpleType name="AccessTypeType">
    <restriction base="string">
        <enumeration value="Open"/>
        <enumeration value="Write"/>
        <enumeration value="Read"/>
        <enumeration value="Execute"/>
    </restriction>
</simpleType>
<complexType name="ObjectType">
    <sequence>
        <choice>
            <element name="Identifier" type="anyURI"/>
            <element ref="m3w-r:KeyHolder"/>
            <element ref="m3w-r:PlatformResource"/>
        </choice>
    </sequence>
    <attribute name="type" type="m3w-r:ObjectTypeType"
    use="required"/>
</complexType>
<simpleType name="ObjectTypeType">
    <restriction base="string">
        <enumeration value="Platform"/>
        <enumeration value="Service"/>
        <enumeration value="Application"/>
    </restriction>
</simpleType>
<element name="PlatformResource"
type="m3w-r:PlatformResourceType"/>
<complexType name="PlatformResourceType"/>
<element name="FileSystem" type="m3w-r:FileSystemType"
substitutionGroup="m3w-r:PlatformResource"/>
<complexType name="FileSystemType">
    <complexContent>
        <extentsion base="m3w-r:PlatformResourceType">
            <attribute name="location" type="anyURI"
            use="required"/>
        </extension>
    </complexContent>
</complexType>
```

TABLE 10

```
    <element name="Memory" type="m3w-r:MemoryType"
substitutionGroup="m3w-r:PlatformResource"/>
    <complexType name="MemoryType">
        <complexContent>
            <extension base="m3w-r:PlatformResourceType">
                <attribute name="address"
                type="string" use="required"/>
            </extension>
        </complexContent>
    </complexType>
    <element name="Socket" type="m3w-r:SocketType"
substitutionGroup="m3w-r:PlatformResource"/>
```

TABLE 10-continued

```
<complexType name="SocketType">
    <complexContent>
        <extension base="m3w-r:PlatformResourceType">
            <attribute name="port"
                type="integer" use="required"/>
        </extension>
    </complexContent>
</complexType>
<element name="KeyHolder" type="m3w-r:KeyHolderType"/>
<complexType name="KeyHolderType">
    <sequence>
        <element name="info" type="dsig:KeyInfoType"/>
    </sequence>
</complexType>
<element name="Principal" type="m3w-r:PrincipalType"/>
<complexType name="PrincipalType">
    <complexContent>
        <restriction base="m3w-r:ObjectType">
            <sequence>
                <choice>
                    <element name="Identifier"
                        type="anyURI"/>
                    <element ref="m3w-r:KeyHolder"/>
                </choice>
            </sequence>
        </restriction>
    </complexContent>
</complexType>
```

TABLE 11

```
<element name="AccessObject" type="m3w-r:ObjectType"/>
<element name="PrincipalGroup" type="m3w-r:PrincipalType"/>
<element name="AccessObjectGroup" type="m3w-r:ObjectType"/>
<element name="Conditions" type="m3w-r:ConditionsType"/>
<complexType name="ConditionsType">
    <sequence>
        <element ref="m3w-r:Condition" minOccurs="0"/>
    </sequence>
</complexType>
<element name="Condition" type="m3w-r:ConditionType"/>
<complexType name="ConditionType"/>
<element name="Size" type="m3w-r:SizeType"
    substitutionGroup="m3w-r:Condition"/>
<complexType name="SizeType">
    <simpleContent>
        <extension base="integer">
            <attribute name="unit" type="m3w-r:UnitType"
                use="required"/>
        </extension>
    </simpleContent>
</complexType>
<simpleType name="UnitType">
    <restriction base="string">
        <enumeration value="byte"/>
        <enumeration value="kilobyte"/>
        <enumeration value="megabyte"/>
        <enumeration value="gigabyte"/>
    </restriction>
</simpleType>
<element name="AccessCount" type="m3w-r:AccessCountType"
    substitutionGroup="m3w-r:Condition"/>
<complexType name="AccessCountType">
    <simpleContent>
        <extension base="integer"/>
    </simpleContent>
</complexType>
</schema>
```

The program or algorithm that provides a middleware structure capable of efficiently managing the access right expression structure for the multimedia middleware service can be stored in the storage medium that can be installed or mounted in a particular apparatus, and the data in the storage medium can be read using an apparatus such as a computer.

Figure 24:
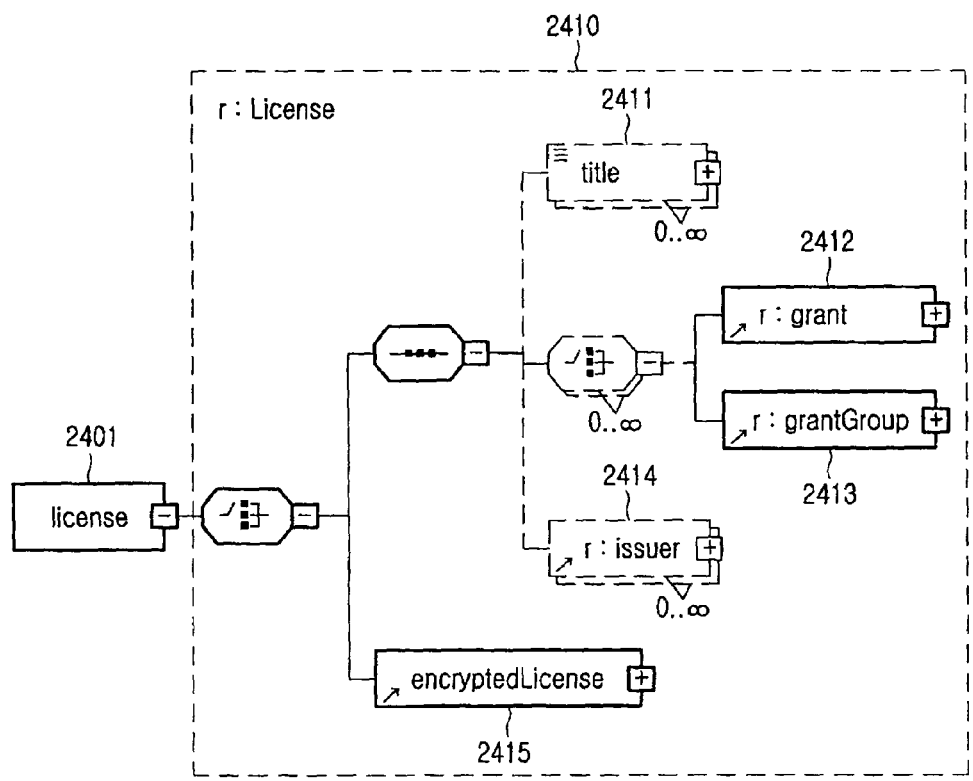
FIG. 24 is a diagram illustrating a basic structure of expressing a right using a license structure of Right Expression Language (REL) technology according to the present invention.

FIG. 24 is a diagram illustrating a basic structure of expressing a right using a license structure of Right Expression Language (REL) technology according to the present invention.

The current REL technology, which is technology corresponding to MPEG-21 Part 5, uses a machine-readable right expression language capable of expressing various rights and granted details for the content using the terms defined in Right Data Dictionary (RDD) of MPEG-21 Part 6. The use of this language can provide a flexible and interoperable mechanism that can transparently and popularly use digital resources while protecting the distributed published digital artistic creations such as movies, music, electronic books, games and the like, and maintaining the rights, conditions and charges of the content. The REL is based on XrML 2.0 by ContentGuard Co., and a right expression language that expresses the rights and the usage rule related to the use and distribution of the content with the XML can be an example of the REL.

A Title 2411 of FIG. 24 is a field for specifying a title of license 2401, a grant 2412 and a grant group (grantGroup) 2413 are fields for specifying a user or a user group granted for use of the license 2401, an issuer 2414 is a field for specifying the original owner of the license 2401, and an encrypted license (encryptedLicense) 2415 is a data structure for specifying an encrypted license.

Table 12 below shows a definition of prefixes and namespaces corresponding thereto, used for extending the right expression for a multimedia middleware to the REL technology.

TABLE 12

| Prefix | Name | Corresponding namespace |
| --- | --- | --- |
| r | REL Core | urn:mpeg:mpeg21:2003:01-REL-R-NS |
| sx | REL Standard Extension | urn:mpeg:mpeg21:2003:01-REL-SX-NS |
| mx | REL Multimedia Extension | urn:mpeg:mpeg21:2003:01-REL-MX-NS |
| mdx | REL Middleware Extension | urn:mpeg:mpeg21:2003:01-REL-MDX-NS |

A first prefix 'r' defined in Table 12 is for specifying core expression of the REL technology. A prefix 'sx' is for specifying extension technology for specifying rights other than the core expression. A prefix 'mx' is an extension prefix for specifying multimedia-related rights. A prefix 'mdx', which is a prefix newly added by the present invention, is an extension prefix for specifying middleware-related rights. The 'mdx' information can be provided to a terminal along with, for example, the service information (Service Profile) described in FIG. 5.

Table 13 and Table 14 below illustrate the overall structure and fields of the license FIG. 24, and an element with an extended namespace 'mdx' attached for the multimedia middleware in Table 13 and Table 14 is an element newly added to the current REL by the present invention.

TABLE 13

| | |
| --- | --- |
| r:license | r:license includes the following sub-elements: r:title, r:grant or r:grantGroup, r:issuer. r:license can be encrypted into r:encryptedLicense and stored. |
| r:grant | It means each r:grant right expression. |
| R:grantGroup | It is a group of each r:grantGroup r:grant. |
| r:issuer | Original owner of license |
| r:encryptedLicense | Encrypted license |
| r:title | Title of license |

TABLE 13-continued

| | |
|---|---|
| r:grant | r:grant has the following sub-elements: R:principal, r:right, r:resource r:condition. |
| r:principal | r:principal means Principal and has |
| r:keyHolder | r:keyholder and mdx:identifier. mdx:identifier, |
| mdx:identifier | which is an element newly added to the conventional REL by the present invention, is an element for specifying an identifier of principal. |
| r:right | r:right has multimedia extension rights mx such as |
| mx:execute | execute, install, modify and uninstall, as rights |
| mx:install | given by license, and middleware extension rights |
| mx:modify | mdx such as open, read and write are added thereto |
| mx:uninstall | by the present invention. |
| mdx:listenSocket | |
| mdx:open | |
| mdx:read | |
| mdx:write | |

TABLE 14

| | |
|---|---|
| r:resource | r:resource has values of r:grant, r:grantGroup, |
| r:grant | r:principal (r:keyHolder, mdx:identifier), |
| r:grantGroup | r:propertyAbstract (sx:name, x:dnsName, |
| r:principal | sx:emailName). |
| r:keyHolder | mdx:identifier, which is an element newly |
| mdx:identifier | added to the conventional REL by the |
| r:propertyAbstract | present invention, is an element for |
| sx:name | specifying an identifier of a resource. |
| sx:dnsName | mdx:platformResource is an element for |
| sx:emailName | expressing a list of platform resources. |
| mdx:platform Resource | |
| r:conditions | r:Condition, which is a condition granted |
| r:allconditions | according to the present license, |
| r:validityInterval | specifies each of granted access address, |
| sx:exerciseLimit | access port and access resource size. |
| sx:territory | |
| mdx:accessAddress | |
| mdx:accessPort | |
| mdx:accessSize | |
| r:encryptedGrant | Encrypted grant |
| r:grantGroup | It is a grant group and can have r:principal or r:resource, r:condition, r:grant as a sub-element. |
| r:encryptedGrantGroup | Encrypted grant group |

Table 15 below shows a structure of an element for specifying a platform resource added to r:resource of Table 14, and a Description for specifying it in the XML.

TABLE 15

| Diagram | platformResource | | | |
|---|---|---|---|---|
| Substitute Group | r:condition | | | |
| Attributes | Name | Type | Use | Semantics |
| | type | PlatformResourceTypeType | Required | The type of the platform's resource. |
| Source | <xsd:complexType name="PlatformResource"> | | | |
| |    <xsd:complexContent> | | | |
| |       <xsd:extension base="r:Resource"> | | | |
| |          <xsd:attribute name="type" type="mdx:PlatformResourceTypeType"/> | | | |
| |       </xsd:extension> | | | |
| |    </xsd:complexContent> | | | |
| | </xsd:complexType> | | | |
| | <xsd:simpleType name="PlatformResourceTypeType"/> | | | |
| |    <xsd:restriction base="xsd:string"> | | | |
| |       <xsd:enumeration value="filesystem"/> | | | |
| |       <xsd:enumeration value="memory"/> | | | |
| |       <xsd:enumeration value="socket"/> | | | |
| |    </xsd:restriction> | | | |
| | </xsd:simpleType> | | | |
| | <xsd:element name="platformResource" type="mdx:PlatformResource" substitutionGroup="r:resource"/> | | | |

Table 16 below shows a structure of an ID (identifier) added to r:resource and r:principal of Table 14, and a Description for specifying it in the XML.

TABLE 16

| | |
|---|---|
| Diagram | identifier |
| Substitute Group | r:principal |
| Children | — |
| Source | <xsd:element name="identifier" type="xsd:anyURI" substitutionGroup="r:principal"/> |

Table 17 below shows a structure of an open right element added to r:right of Table 13, and a Description for specifying it in the XML.

TABLE 17

| | |
|---|---|
| Diagram | open |
| Substitute Group | r:right |
| Children | — |
| Source | <xsd:complexType name="Open"> |
| |    <xsd:complexContent> |
| |       <xsd:extension base="r:Right"/> |
| |    </xsd:complexContent> |
| | </xsd:complexType> |
| | <xsd:element name="open" type="mdx:Open" substitutionGroup="r:right"/> |

Table 18 below shows a structure of a read right element added to r:right of Table 13, and a Description for specifying it in the XML.

TABLE 18

| | |
|---|---|
| Diagram | read |
| Substitute Group | r:right |
| Children | — |
| Source | <xsd:complexType name="Read"> |
| |    <xsd:complexContent> |
| |       <xsd:extension base="r:Right"/> |
| |    </xsd:complexContent> |
| | </xsd:complexType> |

TABLE 18-continued

```
<xsd:element name="read" type="mdx:Read"
    substitutionGroup="r:right"/>
```

Table 19 below shows a structure of a write right element added to r:right of Table 13, and a Description for specifying it in the XML.

TABLE 19

| Diagram | write |
|---|---|
| Substitute Group | r:right |
| Children | — |
| Source | `<xsd:complexType name="Write">`<br>`    <xsd:complexContent>`<br>`        <xsd:extension base="r:Right"/>`<br>`    </xsd:complexContent>`<br>`</xsd:complexType>`<br>`<xsd:element name="write" type="mdx:Write"`<br>`    substitutionGroup="r:right"/>` |

Table 20 below shows a structure of a listen socket (ListenSocket) right element added to r:right of Table 13, and a Description for specifying it in the XML.

TABLE 20

| Diagram | ListenSocket |
|---|---|
| Substitute Group | R:right |
| Children | — |
| Source | `<xsd:complexType name="ListenSocket">`<br>`    <xsd:complexContent>`<br>`        <xsd:extension base="r:Right"/>`<br>`    </xsd:complexContent>`<br>`</xsd:complexType>`<br>`<xsd:element name="red" type="mdx:Read"`<br>`    substitutionGroup="r:right"/>` |

Table 21 below shows a structure of an access address (accessAddress) condition element added to r:condition of Table 14, and a Description for specifying it in the XML.

TABLE 21

| Diagram | accessAddress | | | |
|---|---|---|---|---|
| Substitute Group | r:condition | | | |
| Attributes | Name | Type | Use | Semantics |
| | location | anyURI | Required | Access-granted location, for example, "c:\\myfile\\temp.txt" |
| Source | `<xsd:complexType name="AccessAddress">`<br>`    <xsd:complexContent>`<br>`        <xsd:extension base="r:Condition">`<br>`            <xsd:attribute name="location"`<br>`                type="xsd:anyURI" use="required"/>`<br>`        </xsd:extension>`<br>`    </xsd:complexContent>`<br>`</xsd:complexType>`<br>`<xsd:element name="accessAddress"`<br>`    type="mdx:AccessAddress"`<br>`    substitutionGroup="r:condition"/>` | | | |

Table 22 below shows a structure of an access port (accessport) condition element added to r:condition of Table 14, and a Description for specifying it in the XML.

TABLE 22

| Diagram | accessPort | | | |
|---|---|---|---|---|
| Substitute | r:condition | | | |

TABLE 22-continued

| Group Attributes | Name | Type | Use | Semantics |
|---|---|---|---|---|
| | number | integer | Required | Number of access-granted port |
| Source | `<xsd:complexType name="Accessport">`<br>`    <xsd:complexContent>`<br>`        <xsd:extension base="r:Condition">`<br>`            <xsd:attribute name="number"`<br>`                type="xsd:integer" use="required"/>`<br>`        </xsd:extension>`<br>`    </xsd:complexContent>`<br>`</xsd:complexType>`<br>`<xsd:element name="accessPort" type="mdx:AccessPort"`<br>`    substitutionGroup="r:condition"/>` | | | |

Table 23 below shows a structure of an access size (accessSize) condition element added to r:condition of Table 14, and a Description for specifying it in the XML.

TABLE 23

| Diagram | accessSize |
|---|---|
| Substitute Group | r:condition |
| Source | `<xsd:complexType name="AccessSize">`<br>`    <xsd:simpleContent>`<br>`        <xsd:extension base="xsd:integer">`<br>`    <xsd:simpleContent>`<br>`</xsd:complexType>`<br>`<xsd:element name="accessSize" type="mdx:AccessSize"`<br>`    substitutionGroup="r:condition"/>` |

The second aspect of the present invention can be easily compatible with the REL technology because it can add only the new prefixes and namespaces to the REL technology as a right expression language for middleware by extending the current REL technology. Therefore, this embodiment can achieve both multimedia right expression and middleware right expression with one right expression language, so it can be efficiently used for the middleware for the multimedia service.

As can be understood from the foregoing description, in processing multimedia contents, an open multimedia terminal according to the present invention can simply perform security maintenance and management during interoperation between multimedia middleware apparatuses, or between a multimedia middleware apparatus and an external entity.

Further, in processing a multimedia service, a middleware apparatus in an open multimedia terminal can provide a standardized data structure for specifying a necessary security-related elements and methods.

In addition, a terminal provides a block for security management to multimedia middleware, and has interrelation with the block, thereby increasing security.

Moreover, a middleware structure can easily perform security management through license list management during internal service or internal resource access.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A security management method in multimedia middleware of a terminal that can download a multimedia service provided from an external entity, the method comprising:

if there is an access request for a particular multimedia service, determining whether there is a corresponding multimedia service;

if the access-requested multimedia service does not exist in middleware of the terminal, performing negotiation for secure session setup with the external entity;

setting up a secure session to the external entity using a security parameter selected as a result of the negotiation; and receiving information for the download from the external entity through the secure session, and determining whether to execute the download according to the information received through the secure session, wherein the determination of whether to execute the download further comprises:

receiving a Service Profile of the multimedia service desired to be downloaded from the external entity through the set secure session;

checking a Target Profile related to the Service Profile and a Security Profile related to the secure session in the middleware;

determining to download the multimedia service based on the Service Profile, the Target Profile and the Security Profile; and downloading the multimedia service through the secure session.

2. The security management method of claim 1, wherein the security parameter is expressed as metadata.

3. The security management method of claim 1, wherein the selected security parameter comprises at least one security parameter selected by the external entity in a security parameter list transmitted from the terminal to the external entity.

4. The security management method of claim 1, wherein the security parameter for negotiation comprises at least one of Data Transfer Protocols, Authentication Protocols, Signature Types, and Encryption Types.

5. The security management method of claim 4, wherein the security parameter further comprises Uniform Resource Identifiers (URIs) for a corresponding protocol/algorithm and Preferences for the multimedia middleware.

6. The security management method of claim 4, wherein the security parameter comprises a list of protocols/algorithms supported by the multimedia middleware.

7. The security management method of claim 4, wherein the Signature Types comprises at least one of:

Canonicalization Methods indicating a list of canonicalization algorithms;

Signature Methods indicating a list of generation and verification algorithms;

Transform Methods indicating a list of transform algorithms; and

Digest Methods indicating a list of digest algorithms;

all of which are used for signature provided by the multimedia middleware.

8. The security management method of claim 4, wherein the Encryption Types comprises at least one of:

Encrypted Data Encoding Methods;

Encryption Methods;

Digest Methods; and

Key Agreement Methods;

all of which are supported by the multimedia middleware.

9. The security management method of claim 1, further comprising:

if the access-requested multimedia service does not exist before the negotiation, acquiring a network address of the external entity; and providing a plurality of security parameters supported by the multimedia middleware to the external entity for connection of the secure session to the external entity.

10. The security management method of claim 1, wherein the multimedia service is middleware program needed for processing multimedia application program.

11. A security management apparatus in multimedia middleware of a terminal that can download a multimedia service provided from an external entity, the apparatus comprising:

a security manager for, if a requested particular multimedia service does not exist in middleware of the terminal, performing negotiation for secure session setup with the external entity, and setting up a secure session to the external entity using a security parameter selected as a result of the negotiation; and a service manager for, if there is an access request for the particular multimedia service, determining whether there is the particular multimedia service, receiving information for the download from the external entity through the secure session, and determining whether to execute the download according to the information received through the secure session, wherein the service manager receives a Service Profile of the multimedia service desired to be downloaded from the external entity through the set secure session, checks a Target Profile related to the Service Profile from the RRE in the terminal, checks a Security Profile related to the secure session from the security manager, and determines whether to download the multimedia service based on the Service Profile, the Target Profile and the Security Profile.

12. The security management apparatus of claim 11, wherein the selected security parameter comprises at least one security parameter selected by the external entity in a security parameter list transmitted from the terminal to the external entity.

13. The security management apparatus of claim 11, wherein the security parameter for negotiation comprises at least one of Data Transfer Protocols, Authentication Protocols, Signature Types, and Encryption Types.

14. The security management apparatus of claim 13, wherein the security parameter further comprises Uniform Resource Identifiers (URIs) for a corresponding protocol/algorithm and Preferences for the multimedia middleware.

15. The security management apparatus of claim 13, wherein the security parameter comprises a list of protocols/algorithms supported by the multimedia middleware.

16. The security management apparatus of claim 13, wherein the Signature Types comprises at least one of:

Canonicalization Methods indicating a list of canonicalization algorithms;

Signature Methods indicating a list of generation and verification algorithms;

Transform Methods indicating a list of transform algorithms; and

Digest Methods indicating a list of digest algorithms;

all of which are used for signature provided by the multimedia middleware.

17. The security management apparatus of claim 13, wherein the Encryption Types comprises at least one of:

Encrypted Data Encoding Methods;

Encryption Methods;

Digest Methods; and

Key Agreement Methods;

all of which are supported by the multimedia middleware.

18. The security management apparatus of claim 11, wherein if the particular multimedia service does not exist, the service manager acquires a network address of the external entity from a Moving Picture Experts Group (MPEG) Multimedia MiddleWare (M3W) Run-time Environment (RRE) in the terminal.

19. The security management apparatus of claim 11, wherein the security manager provides a plurality of security parameters supported by the multimedia middleware to the external entity for connection of the secure session to the external entity.

20. The security management apparatus of claim 11, wherein the multimedia service is middleware program needed for processing multimedia application program.

21. A storage medium in which multimedia middleware capable of downloading a multimedia service is stored, the storage medium comprising:
  a security manager within the multimedia middleware for, if a requested particular multimedia service does not exist in the multimedia middleware, performing negotiation for secure session setup with an external entity from which the multimedia service can be downloaded, and setting up a secure session to the external entity using a security parameter selected as a result of the negotiation; and
  a service manager within the multimedia middleware for, if there is an access request for the particular multimedia service, determining whether there is the particular multimedia service, receiving information for the download from the external entity through the secure session, and determining whether to execute the download according to the information received through the secure session,
  wherein the service manager comprises:
  receiving a Service Profile of the multimedia service desired to be downloaded from the external entity through the set secure session;
  checking a Target Profile related to the Service Profile from the RRE in the terminal;
  checking a Security Profile related to the secure session from the security manager; and
  determining whether to download the multimedia service based on the Service Profile, the Target Profile and the Security Profile.

22. The storage medium of claim 21, wherein the selected security parameter comprises at least one security parameter selected by the external entity in a security parameter list transmitted from the terminal to the external entity.

23. The storage medium of claim 21, wherein the security parameter for negotiation comprises at least one of Data Transfer Protocols, Authentication Protocols, Signature Types, and Encryption Types.

24. The storage medium of claim 23, wherein the security parameter further comprises Uniform Resource Identifiers (URIs) for a corresponding protocol/algorithm and Preferences for the multimedia middleware.

25. The storage medium of claim 23, wherein the security parameter comprises a list of protocols/algorithms supported by the multimedia middleware.

26. The storage medium of claim 21, wherein the multimedia service is middleware program needed for processing multimedia application program.

27. A security management method performed in multimedia middleware in a terminal, the method comprising:
  receiving, by a service manager included in the multimedia middleware in the terminal, an access request to a particular multimedia service from a particular application program included in the terminal;
  checking, by a security manager included in the multimedia middleware, through a Moving Picture Experts Group (MPEG) Multimedia MiddleWare (M3W) Run-time Environment (RRE) included in the multimedia middleware, a license list including access right information corresponding to the received access request; and
  if the particular application program is granted access to the particular multimedia service, delivering a handler for the particular multimedia service from the service manager to the particular application program;
  wherein the license list includes information indicating an access right of application programs for middleware services supportable by the terminal.

28. The security management method of claim 27, wherein the information indicating the access right is expressed as metadata, and comprises information indicating at least one of an access principal, an access type, an access object, and an access condition of the multimedia middleware.

29. The security management method of claim 28, wherein the access principal is the application program, and the information indicating the access principal comprises an identifier of the access principal and key information granted with an electronic signature method.

30. The security management method of claim 28, wherein the access principal is the application program, and the information indicating the access type indicates that at least one of Open, Write, Read, and Execute is granted.

31. The security management method of claim 28, wherein the access principal is the application program, and the information indicating the access object comprises an identifier of the multimedia service and key information granted with an electronic signature method.

32. The security management method of claim 28, wherein the access principal is the application program, and the information indicating the access condition comprises at least one of accessible file system, memory size, and access count.

33. A security management method performed in multimedia middleware in a terminal, the method comprising:
  receiving, from a service manager included in the multimedia middleware, by a security manager included in the multimedia middleware, request to access a particular platform resource from a particular multimedia service;
  generating, by the security manager, an access identifier corresponding to the received access request; and
  checking, by a Moving Picture Experts Group (MPEG) Multimedia MiddleWare (M3W) Run-time Environment (RRE) included in the multimedia middleware, a license list including access right information based on the generated access identifier; and
  if the particular multimedia service is granted access to the particular platform resource, delivering, by the M3W RRE, the particular platform resource to the particular multimedia service;
  wherein the license list comprises information indicating an access right of multimedia services for platform resources supported by the terminal.

34. The security management method of claim 33, wherein the information indicating the access right is expressed as metadata, and comprises information indicating at least one of an access principal, an access type, an access object, and an access condition of the multimedia middleware.

35. The security management method of claim 34, wherein the access principal is the multimedia service, and the information indicating the access principal comprises an identifier of the access principal and key information granted with an electronic signature method.

36. The security management method of claim 34, wherein the access principal is the multimedia service, and the information indicating the access type indicates that at least one of Open, Write, Read, and Execute is granted.

37. The security management method of claim 34, wherein the access principal is the multimedia service, and the information indicating the access object comprises an identifier of the platform resource and key information granted with an electronic signature method.

38. The security management method of claim 34, wherein the access principal is the multimedia service, and the information indicating the access condition comprises at least one of accessible file system, memory size, and access count.

39. A security management apparatus included in multimedia middleware in a terminal, the apparatus comprising:
a service manager included in the multimedia middleware in the terminal for receiving an access request to a particular multimedia service from a particular application program included in the terminal, and delivering a handler for the particular multimedia service to the particular application program, if the particular application program is granted access to the particular multimedia service; and
a security manager included in the multimedia middleware in the terminal for checking, through a Moving Picture Experts Group (MPEG) Multimedia MiddleWare (M3W) Run-time Environment (RRE) included in the multimedia middleware, a license list including access right information for the particular application program in response to a request received from the service manager corresponding to the received access request;
wherein the license list comprises information indicating an access right of application programs for middleware services supportable by the terminal.

40. The security management apparatus of claim 39, wherein the information indicating the access right is expressed as metadata, and comprises information indicating at least one of an access principal, an access type, an access object, and an access condition of the multimedia middleware.

41. The security management apparatus of claim 40, wherein the access principal is the application program, and the information indicating the access principal comprises an identifier of the access principal and key information granted with an electronic signature method.

42. The security management apparatus of claim 40, wherein the access principal is the application program, and the information indicating the access type indicates that at least one of Open, Write, Read, and Execute is granted.

43. The security management apparatus of claim 40, wherein the access principal is the application program, and the information indicating the access object comprises an identifier of the multimedia service and key information granted with an electronic signature method.

44. The security management apparatus of claim 40, wherein the access principal is the application program, and the information indicating the access condition comprises at least one of accessible file system, memory size, and access count.

45. A security management apparatus included in multimedia middleware in a terminal, the apparatus comprising:
a security manager included in the multimedia middleware in the terminal for, if a request to access a particular platform resource from a particular multimedia service is received from a service manager included in the multimedia middleware in the terminal, generating an access identifier corresponding to the received access request, and if the particular multimedia service is granted access to the particular platform resource, delivering system resources to the particular multimedia service; and
a Moving Picture Experts Group (MPEG) Multimedia MiddleWare (M3W) Run-time Environment (RRE) included in the multimedia middleware in the terminal for checking, in response to a request received from the security manager corresponding to the received access request, a license list including access right information based on the access identifier;
wherein the license list comprises information indicating an access right of multimedia services for platform resources supported by the terminal.

46. The security management apparatus of claim 45, wherein the information indicating the access right is expressed as metadata, and comprises information indicating at least one of an access principal, an access type, an access object, and an access condition of the multimedia middleware.

47. The security management apparatus of claim 46, wherein the access principal is the multimedia service, and the information indicating the access principal comprises an identifier of the access principal and key information granted with an electronic signature method.

48. The security management apparatus of claim 46, wherein the access principal is the multimedia service, and the information indicating the access type indicates that at least one of Open, Write, Read, and Execute is granted.

49. The security management apparatus of claim 46, wherein the access principal is the multimedia service, and the information indicating the access object comprises an identifier of the platform resource and key information granted with an electronic signature method.

50. The security management apparatus of claim 46, wherein the access principal is the multimedia service, and the information indicating the access condition comprises at least one of accessible file system, memory size, and access count.

51. A storage medium, in which multimedia middleware is stored, included in a terminal, the storage medium comprising:
a service manager included in the multimedia middleware in the terminal for receiving an access request to a particular multimedia service from a particular application program included in the terminal, and delivering a handler for the particular multimedia service to the particular application program, if the particular application program is granted access to the particular multimedia service; and
a security manager included in the multimedia middleware in the terminal for checking, through a Moving Picture Experts Group (MPEG) Multimedia MiddleWare (M3W) Run-time Environment (RRE) included in the multimedia middleware, a license list including access right information for the particular application program in response to a request received from the service manager corresponding to the received access request;
wherein the license list comprises information indicating an access right to application programs for middleware services supportable by the terminal.

52. A storage medium, in which multimedia middleware is stored, included in a terminal, the storage medium comprising:

a security manager included in the multimedia middleware in the terminal for, if a request to access a particular platform resource of a terminal from a particular multimedia service is received from a service manager included in the multimedia middleware in the terminal, generating an access identifier corresponding to the received access request, and if the particular multimedia service is granted access to the particular platform resource, delivering system resources of the terminal to the particular multimedia service; and a Moving Picture Experts Group (MPEG) Multimedia MiddleWare (M3W) Run-time Environment (RRE) included in the multimedia middleware in the terminal for checking, in response to a request received from the security manager corresponding to the received access request, a license list including access right information based on the access identifier;

wherein the license list comprises information indicating an access right to multimedia services for platform resources supported by the terminal.

* * * * *